United States Patent
Lee

(10) Patent No.: US 10,622,661 B2
(45) Date of Patent: Apr. 14, 2020

(54) FUEL CELL STACK

(71) Applicants: Hyundai Motor Company, Seoul (KR); Kia Motors Corporation, Seoul (KR)

(72) Inventor: Dong Sun Lee, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 347 days.

(21) Appl. No.: 15/830,231

(22) Filed: Dec. 4, 2017

(65) Prior Publication Data

US 2019/0140302 A1    May 9, 2019

(30) Foreign Application Priority Data

Nov. 7, 2017   (KR) .................. 10-2017-0147540

(51) Int. Cl.
*H01M 8/248*   (2016.01)
*H01M 8/2475*  (2016.01)
(Continued)

(52) U.S. Cl.
CPC ......... *H01M 8/248* (2013.01); *H01M 8/1018* (2013.01); *H01M 8/241* (2013.01); *H01M 8/2475* (2013.01); *H01M 2008/1095* (2013.01)

(58) Field of Classification Search
CPC .. H01M 8/1018; H01M 8/241; H01M 8/2475; H01M 8/248; H01M 2008/1095
See application file for complete search history.

(56) References Cited

U.S. PATENT DOCUMENTS 4,037,022 A * 7/1977 Cheron ............... H01M 8/02
                                                  429/10
8,012,648 B2   9/2011 Bogumil et al.
(Continued)

FOREIGN PATENT DOCUMENTS

JP    2005228506 A    8/2005
JP    3719419 B2    11/2005
(Continued)

OTHER PUBLICATIONS

Machine translation of Japanese Patent Publication No. 2005-228506, published Aug. 25, 2005. (Year: 2005).*

*Primary Examiner* — Miriam Stagg
*Assistant Examiner* — Lilia Nedialkova
(74) *Attorney, Agent, or Firm* — Mintz Levin Cohn Ferris Glovsky and Popeo, P.C.; Peter F. Corless

(57) ABSTRACT

A fuel cell stack is provided that includes a cell laminate formed by stacking a plurality of unit cells in a predetermined stacking direction and a surface pressure adjustment unit stacked on a first surface of the cell laminate. The surface pressure adjustment unit adjusts a surface pressure applied to the unit cells in the stacking direction. The unit includes a first electromagnet and a second electromagnet installed between one surface of the cell laminate and the first electromagnet to pressurize the unit cells. A controller adjusts pressurizing force applied to the unit cells by the second electromagnet by selectively applying a current to the first and second electromagnets so that attractive force or repulsive forces acts between the first and second electromagnets.

20 Claims, 31 Drawing Sheets

(51) Int. Cl.
*H01M 8/1018* (2016.01)
*H01M 8/241* (2016.01)

(56) References Cited

U.S. PATENT DOCUMENTS

2006/0147776 A1* 7/2006 Sarata .................... C01B 3/065
                429/416
2016/0172703 A1* 6/2016 Horlock .............. H01M 8/2415
                429/456

FOREIGN PATENT DOCUMENTS

| | | | |
|---|---|---|---|
| JP | 2006-0179238 A | | 7/2006 |
| JP | 2007242532 A | * | 9/2007 |
| KR | 10-0514375 B1 | | 9/2005 |
| KR | 2006-0019843 A | | 3/2006 |
| KR | 2009-0120070 A | | 11/2009 |
| KR | 2013-0028185 A | | 3/2013 |

* cited by examiner

FUEL CELL STACK

CROSS-REFERENCE TO RELATED APPLICATION

This application is based on and claims the benefit of priority to Korean Patent Application No. 10-2017-0147540, filed on Nov. 7, 2017, the disclosure of which is incorporated herein in its entirety by reference.

TECHNICAL FIELD

The present disclosure relates to a fuel cell stack, and more particularly, to a fuel cell stack in which surface pressured applied to the unit cells is adjusted.

BACKGROUND

A fuel cell, which is a main power supply of a fuel cell system, is a device supplied with oxygen corresponding to an oxidant and hydrogen corresponding to fuel to generate electricity while generating water. In the fuel cell, high purity hydrogen is supplied from a hydrogen storage tank to an anode of a fuel cell stack, and air including oxygen in the atmosphere is directly supplied to a cathode of the fuel cell stack by an air supply device such as an air compressor. Hydrogen supplied to the anode is separated into a proton and an electron by a catalyst of the anode and the proton is moved to the cathode through a polymer electrolyte membrane. Oxygen in the air supplied to the cathode combines with electrons introduced into the cathode through an external wire to generate electric energy while generating water.

Generally, the fuel cell stack includes a cell laminate formed by stacking at least several hundreds of unit cells, end plates disposed at both ends of the cell laminate, respectively, a fastening member that fastens the end plates to apply a predetermined surface pressure to the unit cells of the cell laminate, and the like. In particular, the term "unit cell" refers to a unit body formed by stacking a polymer electrolyte membrane, an anode, a cathode, a separator, a gasket, and the like.

Meanwhile, the surface pressure applied to the unit cells may be changed by various causes such as degradation of the fuel cell stack, contraction of the gasket due to a decrease in temperature, and the like. A change in surface pressure applied to the unit cells as described above becomes a main cause of deteriorating performance of the fuel cell stack such as gas leakage, a decrease in output power, deterioration of durability, or the like. However, since a fuel cell stack according to the related art does not include a configuration for compensating for a change in surface pressure applied to unit cells, performance of the fuel cell stack is deteriorated due to the change in surface pressure applied to the unit cells.

SUMMARY

The present disclosure provides a fuel cell stack of which a structure is improved by the adjustment of a surface pressure applied to unit cells.

According to an exemplary embodiment of the present disclosure, a fuel cell stack may include: a cell laminate formed by stacking a plurality of unit cells in a predetermined stacking direction; and a surface pressure adjustment unit stacked on one surface of the cell laminate and configured to adjust a surface pressure applied to the unit cells in the stacking direction. The surface pressure adjustment unit may include: a first electromagnet; a second electromagnet installed between one surface of the cell laminate and the first electromagnet \to pressurize the unit cells; and a controller configured to adjust pressurizing force applied to the unit cells by the second electromagnet by selectively applying a current to the first and second electromagnets so that attractive force or repulsive forces acts between the first and second electromagnets.

The surface pressure adjustment unit may further include a housing having an accommodation space in which the first and second electromagnets may be accommodated The second electromagnet may be installed to be slidably moved in the stacking direction to be spaced apart from the first electromagnet or abut to the first electromagnet. The housing further may have an opening that allows the accommodation space to be opened toward a first surface of the cell laminate. One end portion of the cell laminate may be inserted into the accommodation space through the opening. The second electromagnet may have a predetermined clubs-sectional area to guide one end portion thereof the outside of the accommodation space through the opening.

The housing further may further include a fluid chamber disposed in the first electromagnet and an inner side surface of the housing and having an internal space filled with a fluid, and the first electromagnet may include a connection aperture punctured to connect an intermediate space between the first and second electromagnets to the internal space of the fluid chamber, and an opening/closing valve configured to open or close the connection aperture to adjust a flow of the fluid through the connection aperture. The opening/closing valve may have an area greater than that of the connection aperture to thus cover the connection aperture, and be formed to be elastically deformed by a pressure of the fluid. The opening/closing valve may be mounted to cover the connection aperture on one surface of the first electromagnet facing one surface of the second electromagnet to be selectively supported by one surface of the second electromagnet when a spaced distance between the first and second electromagnets is less than a predetermined reference distance.

One of the first and second electromagnets may include a guide groove formed to be depressed in the stacking direction, and the other of the first and second electromagnets may include a guide protrusion formed to protrude to insert the guide protrusion into the guide groove to be slidably moved in the stacking direction. The guide protrusion may have an internal space filled with a fluid, a connection aperture that connects an intermediate space between the guide protrusion and the guide groove to the internal space, and an opening/closing valve configured to open or close the connection aperture to adjust a flow of the fluid through the connection aperture.

The connection aperture may include first and second connection apertures formed, respectively, to connect the intermediate space to the internal space, and the opening/closing valve may have a first opening/closing valve configured to open or close the first connection aperture to allow the fluid to flow from the internal space to the intermediate space through the first connection aperture, and a second opening/closing valve configured to open or close the second connection aperture to allow the fluid to flow from the intermediate space to the internal space through the second connection aperture.

The first opening/closing valve may have an area greater than that of the first connection aperture to cover the first connection aperture, and be formed to be elastically deformed by a pressure of the fluid. The first opening/ closing valve may be mounted to cover the first connection aperture on an outer side surface of the guide protrusion facing an inner side surface of the guide groove to be supported by the inner side surface of the guide groove when an interval between the first and second electromagnets is less than a predetermined reference interval. The other of the first and second electromagnets may further include a pressurizing member configured to elastically pressurize the fluid filled in the internal space.

The second opening/closing valve may include: a cover plate having an area greater than that of the second connection aperture to cover the second connection aperture, and installed in the internal space; and an elastic member configured to elastically pressurize the cover plate toward an inner side surface of the internal space to cause the cover plate to abut to the inner side surface of the internal space when the cover plate covers the second connection aperture.

The fuel cell stack may further include: an end plate stacked on a second surface of the cell laminate; and a fastening member that fastens the end plate and the surface pressure adjustment unit to each other. The fastening member may be a fastening band elastically deformed in the stacking direction. The surface pressure adjustment unit may include: a wedge; and an elastic member configured to elastically pressurize the wedge to be entered into an intermediate space between the first and second electromagnets when the second electromagnet is spaced apart from the first electromagnet. The wedge may have an inclined structure in which a thickness thereof in the stacking direction is gradually decreased from the elastic member to the intermediate space.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
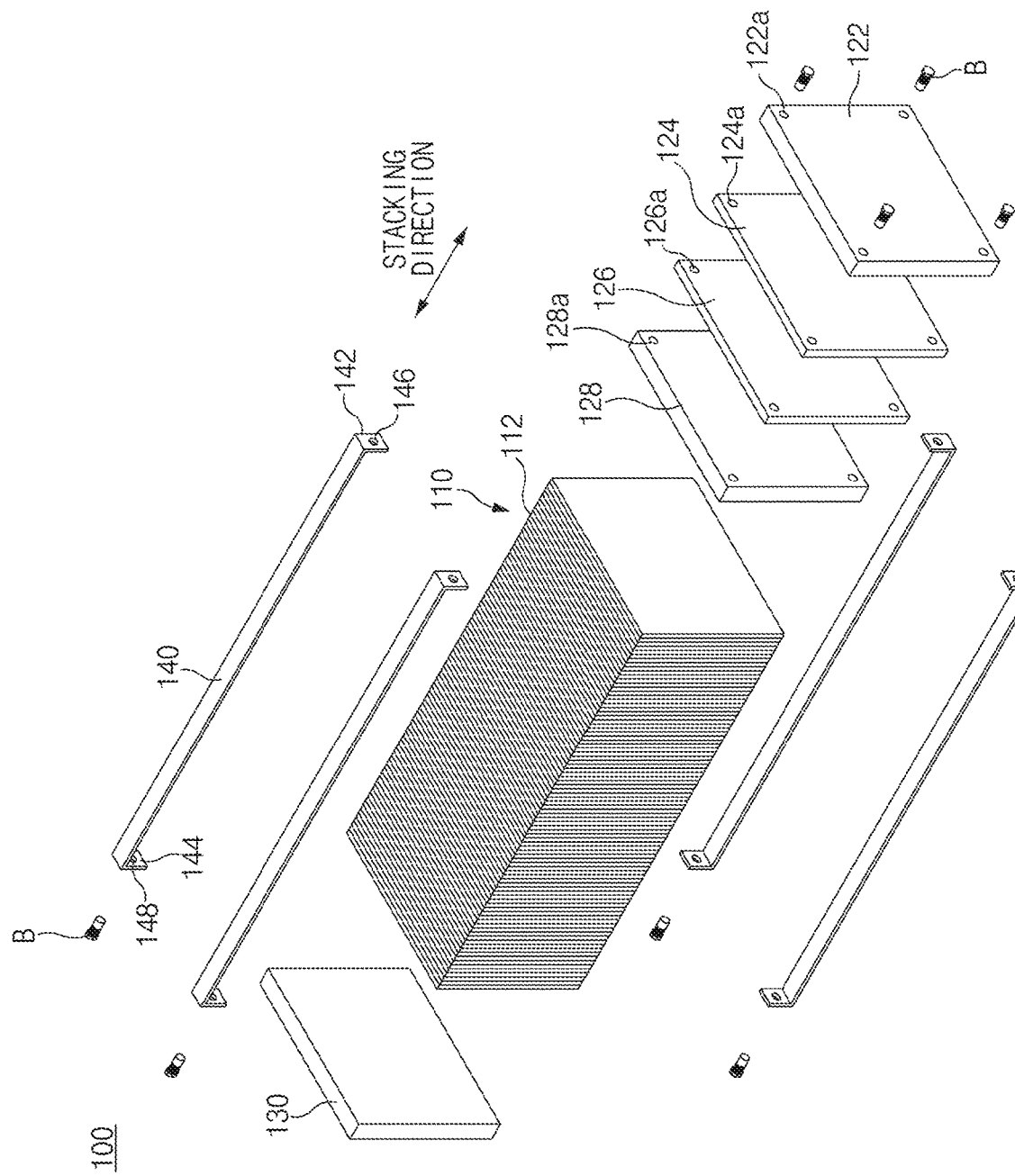
FIG. 1 is a detailed view of a fuel cell stack according to a first exemplary embodiment of the present disclosure.

It is understood that the tem) "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the tem) "about."

Hereinafter, exemplary embodiments of the present disclosure will be described in detail with reference to the accompanying drawings. It is to be noted that in giving reference numerals to components of the accompanying drawings, the same components will be denoted by the same reference numerals even though they are illustrated in different drawings. Further, in describing exemplary embodiments of the present disclosure, well-known constructions or functions will not be described in detail in the case in which it is decided that they may unnecessarily obscure the understanding of exemplary embodiments of the present disclosure.

Terms 'first', 'second', A, B, (a), (b), and the like, will be used in describing components of exemplary embodiments of the present disclosure. These terms are used only to distinguish any component from other components, and features, sequences, or the like, of corresponding components are not limited by these terms. In addition, unless defined otherwise, all the terms used in the present specification, including technical and scientific terms, have the same meanings as meanings that are generally understood by those skilled in the art to which the present disclosure pertains. It should be interpreted that terms defined by a generally used dictionary are identical with the meanings within the context of the related art, and they should not be ideally or excessively formally interpreted unless the context clearly dictates otherwise.

Figure 2:
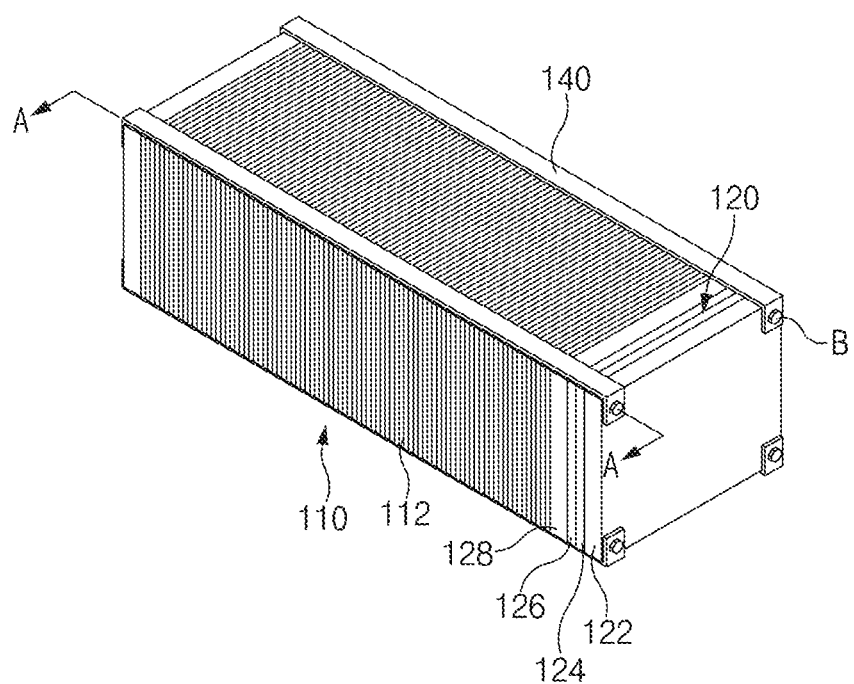
FIG. 2 is an assembly perspective view of the fuel cell stack illustrated in FIG. 1 according to a first exemplary embodiment of the present disclosure.
Figure 3:
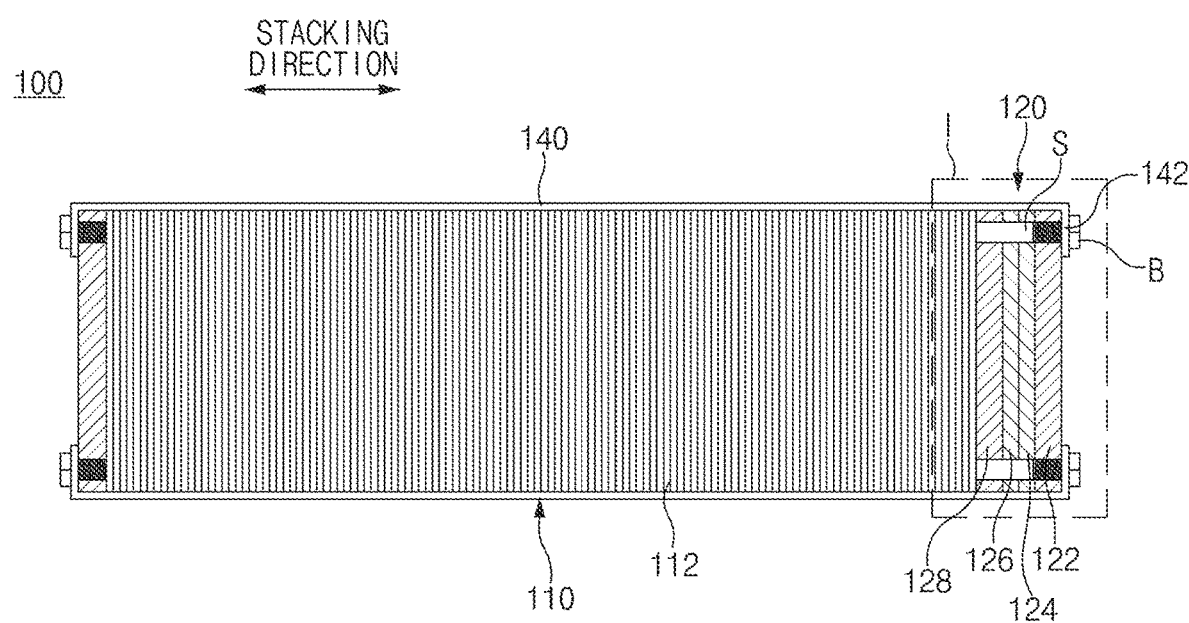
FIG. 3 is a cross-sectional view of the fuel cell stack, taken along line A-A of FIG. 2 according to a first exemplary embodiment of the present disclosure.
Figure 4:
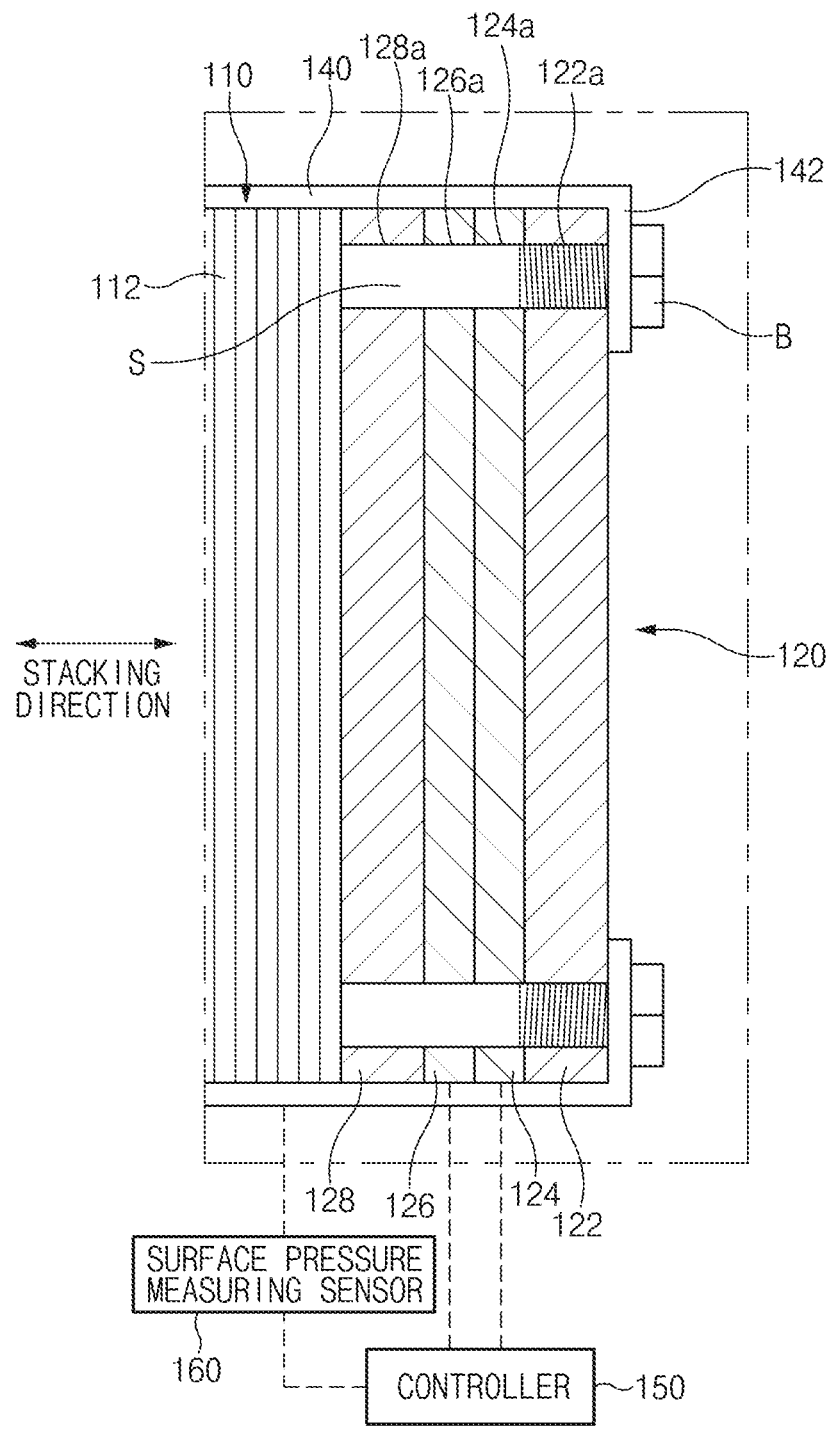
FIG. 4 is a partially enlarged view of part I of FIG. 3 according to a first exemplary embodiment of the present disclosure.

FIG. 1 is a detailed view of a fuel cell stack according to a first exemplary embodiment of the present disclosure, FIG. 2 is an assembly perspective view of the fuel cell stack illustrated in FIG. 1, and FIG. 3 is a cross-sectional view of the fuel cell stack, taken along line A-A of FIG. 2, and FIG. 4 is a partially enlarged view of part I of FIG. 3.

Referring to FIGS. 1 and 2, a fuel cell stack 100 according to the first exemplary embodiment of the present disclosure may include a cell laminate 110 formed by stacking a plurality of unit cells 112 in a predetermined stacking direction; a surface pressure adjustment unit 120 stacked on a first surface of the cell laminate 110 and configured to adjust a surface pressure applied to the unit cells 112; an end plate 130 stacked on a second surface of the cell laminate 110; a fastening member 140 configured to fasten the end plate 130 and the surface pressure adjustment unit 120 to each other; and a controller 150 configured to operate the surface pressure adjustment unit 120, etc.

First, as illustrated in FIG. 1, the cell laminate 110 may be formed by stacking the plurality of unit cells 112 in the predetermined stacking direction. Since the unit cells 112 and the cell laminate 110 as described above have the same structures as those of unit cells 112 and a cell laminate 110 of a general fuel cell stack 100, a detailed description thereof will be omitted. As illustrated in FIG. 2, the surface pressure adjustment unit 120 may be stacked on the first surface of the cell laminate 110 in the stacking direction. The surface pressure adjustment unit 120 may have the same cross-sectional area as that of the first surface of the cell laminate 110, but is not limited thereto. The surface pressure adjustment unit 120 as described above may change the surface pressure applied to the unit cells 112 in the stacking direction by pressurizing one surface of the cell laminate 110 in the stacking direction. The surface pressure adjustment unit 120 will be described in more detail below.

As illustrated in FIGS. 1 and 2, the end plate 130 may be stacked on the second surface of the cell laminate 110 opposing the first surface of the cell laminate 110 in the stacking direction. A material of the end plate 130 as described above is not particularly limited. For example, the end plate 130 may be made of a material such as an aluminum alloy, a stainless material, glass fiber-reinforced plastic, or the like. As illustrated in FIG. 2, the fastening member 140 may be configured to fasten the end plate 130 and the surface pressure adjustment unit 120 to apply a predetermined surface pressure to the unit cells 112 in the stacking direction. A structure of the fastening member 140 is not particularly limited. For example, the fastening member 140 may be a fastening band elastically deformed in the stacking direction. A material of the fastening member 140 is not particularly limited. For example, the fastening member 140 may be made of a material such as fiber-reinforced plastic, stainless steel, or the like.

A method of fastening the end plate 130 and the surface pressure adjustment unit 120 using the fastening member 140 as described above is not particularly limited. For example, as illustrated in FIG. 2, the fastening member 140 may be screw-coupled to each of the end plate 130 and the surface pressure adjustment unit 120 by bolts B, thereby fastening the end plate 130 and the surface pressure adjustment unit 120. Accordingly, the fastening member 140 may include bent parts 142 and 144 bent at both ends thereof to face the end plate 130 or the surface pressure adjustment unit 120, respectively, and screw bores 146 and 148 punctured to be screw-coupled to a screw part S of the bolt B. When the end plate 130 and the surface pressure adjustment unit 120 are fastened by the fastening member 140 as described above, the predetermined surface pressure may be applied to the unit cells 112 interposed between the end plate 130 and the surface pressure adjustment unit 120 in the stacking direction. For convenience of explanation, the surface pressure applied to the unit cells 112 in the stacking direction will be referred to as a 'surface pressure of the unit cells 112'.

Meanwhile, as illustrated in FIG. 4, a surface pressure measuring sensor 160 configured to measure the surface pressure of the unit cells 112 may be mounted on the fastening member 140. The surface pressure measuring sensor 160 may be a strain gauge sensor capable of displacement of the fastening member 140 in the stacking direction. The surface pressure of the unit cells 112, measured by the surface pressure measuring sensor 160 as described above may be input to a controller 150 to be described below.

Although the case in which the surface pressure measuring sensor 160 is the strain gauge sensor mounted on the fastening member 140 is described, but the surface pressure measuring sensor 160 is not limited thereto. In other words, the surface pressure measuring sensor 160 may be composed of at least one of sensors configured to measure the surface pressure of the unit cells 112, such as a load cell capable of measuring a load applied to the unit cells 112, and the like. The controller 150 may be configured to execute overall driving of a fuel cell system including the fuel cell stack 100. The controller 150 as described above may further be configured to operate the surface pressure adjustment unit 120 based on the surface pressure of the unit cells 112 input from the surface pressure measuring sensor 160. A method of controlling the surface pressure adjustment unit 120 will be described in detail below.

Figure 5:
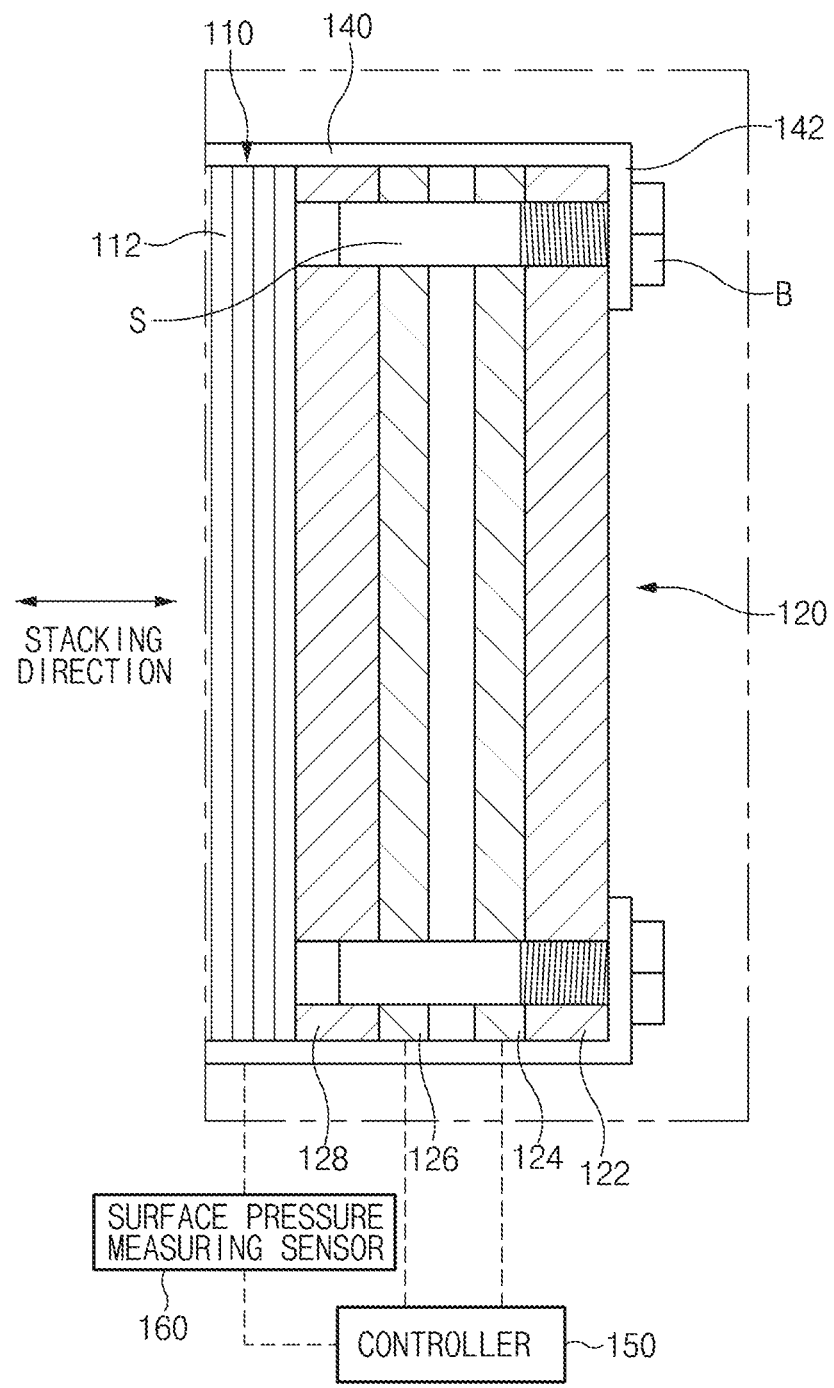
FIG. 5 is a view illustrating a method of increasing a surface pressure of unit cells using a surface pressure adjustment unit illustrated in FIG. 4 according to a first exemplary embodiment of the present disclosure.

FIG. 5 is a view illustrating a method of increasing the surface pressure of the unit cells using the surface pressure adjustment unit illustrated in FIG. 4. The surface pressure adjustment unit 120 may be configured to pressurize the unit cells 112 using electromagnets 124 and 126 in the stacking direction to adjust the surface pressure of the unit cells 112. For example, as illustrated in FIG. 4, the surface pressure adjustment unit 120 may include a fixation plate 122 fixedly installed to be spaced apart from one surface of the cell laminate 110, a first electromagnet 124 fixedly installed between the fixation plate 122 and a first surface of the cell laminate 110, a second electromagnet 126 installed between the first electromagnet 124 and a first surface of the cell laminate 110 to be movable in the stacking direction, a pressurizing plate 128 installed between the second electromagnet 126 and the first surface of the cell laminate 110 to be movable in the stacking direction, and the like.

As illustrated in FIG. 4, the fixation plate 122 may include a screw bore 122a having an inner peripheral surface on which a screw thread capable of being screw-coupled to the screw part S of the bolt B is formed The fixation plate 122 as described above may be fixedly installed to be spaced apart from the first surface of the cell laminate 110 by screw-coupling the screw part S of the bolt B and the screw bore 122a of the fixation plate 122 to each other. As illustrated in FIG. 4, the first electromagnet 124 may include a screw bore 124a having an inner peripheral surface on which a screw thread capable of being screw-coupled to the screw part S of the bolt B is formed. The first electromagnet 124 as described above may be fixedly installed to be positioned between the fixation plate 122 and the first surface of the cell laminate 110 by screw-coupling the screw part S of the bolt B and the screw bore 124a of the first electromagnet 124 to each other.

As illustrated in FIG. 4, the second electromagnet 126 may include a guide aperture 126a in which the screw part S of the bolt B may be inserted The guide aperture 126a has a diameter greater than that of the screw part S of the bolt B to allow the screw part S of the bolt B to be slidably moved along the guide aperture 126a in the stacking direction. The second electromagnet 126 as described above may be installed to be slidably moved in the stacking direction between the first electromagnet 124 and the first surface of the cell laminate 110 by inserting the screw part S of the bolt B into the guide aperture 126a of the second electromagnet 126.

As illustrated in FIG. 4, the pressurizing plate 128 may include a guide aperture 128a in which the screw part S of the bolt B may be inserted. The guide aperture 128a has a diameter greater than that of the screw part S of the bolt B to allow the screw part S of the bolt B to be slidably moved along the guide aperture 128a in the stacking direction. The pressurizing plate 128 as described above may be installed to be slidably moved in the stacking direction between the second electromagnet 126 and the first surface of the cell laminate 110 by inserting the screw part S of the bolt B into the guide aperture 128a of the pressurizing plate 128.

The pressurizing plate 128 as described above may be configured to pressurize one surface of the cell laminate 110 to increase the surface pressure of the unit cells 112. More specifically, when a current is applied to the electromagnets 124 and 12 so that the electromagnets 124 and 126 have the same polarity as each other, repulsive force acts between the electromagnets 124 and 126. However, as described above, the first electromagnet 124 may be fixedly installed, and the second electromagnet 126 may be installed to be slidably moved in the stacking direction. Therefore, as illustrated in FIG. 5, the second electromagnet 126 may be slid and moved toward the cell laminate 110 by repulsive force, and the pressurizing plate 128 may be pressurized by the second electromagnet 126 to be slid and moved toward the cell laminate 110, to pressurize the first surface of the cell laminate 110. Therefore, the pressurizing plate 128 may increase the surface pressure of the unit cells 112 by pressurizing the East surface of the cell laminate 110 by pressurizing force applied from the second electromagnet 126.

The controller 150 may be configured to operate the surface pressure adjustment unit 120 as described above to adjust the surface pressure of the unit cells 112 to be a predetermined reference surface pressure. For example, the controller 150 may be configured to apply the current to the electromagnets 124 and 126 to allow the pressurizing plate 128 to apply pressurizing force to the East surface of the cell laminate 110 when the surface pressure of the unit cells 112 measured by the surface pressure measuring sensor is decreased to be less than the predetermined reference surface pressure. Pressurizing force applied to the cell laminate 110 by the pressurizing plate 128 is proportional to repulsive force acting between the electromagnets 124 and 126. Therefore, the controller 150 may be configured to adjust the surface pressure of the unit cells 112 to the reference surface pressure by applying the current to the electromagnets 124 and 126 so repulsive force proportional to a difference between the surface pressure of the unit cells 112 measured by the surface pressure measuring sensor 160 and the reference surface pressure acts between the electromagnets.

As described above, the fuel cell stack 100 may include the surface pressure adjustment unit 120 configured to adjust the surface pressure of the unit cells 112 by pressuring the cell laminate 110 using magnetic force acting between the electromagnets 124 and 126. Therefore, the fuel cell stack 100 may prevent performance of the fuel cell stack 100 from being deteriorated by a decrease in surface pressure of the unit cells 112.

Figure 6:
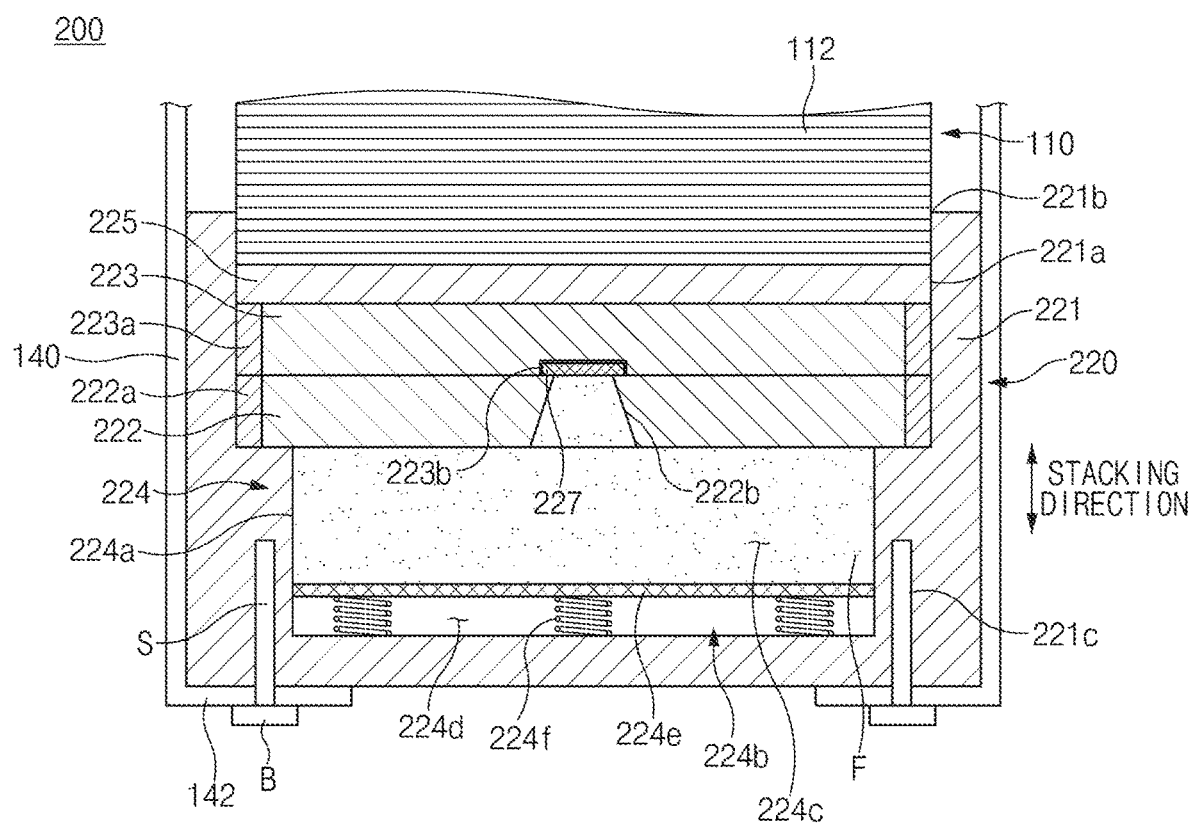
FIG. 6 is a partial clubs-sectional view of a fuel cell stack according to a second exemplary embodiment of the present disclosure.
Figure 7:
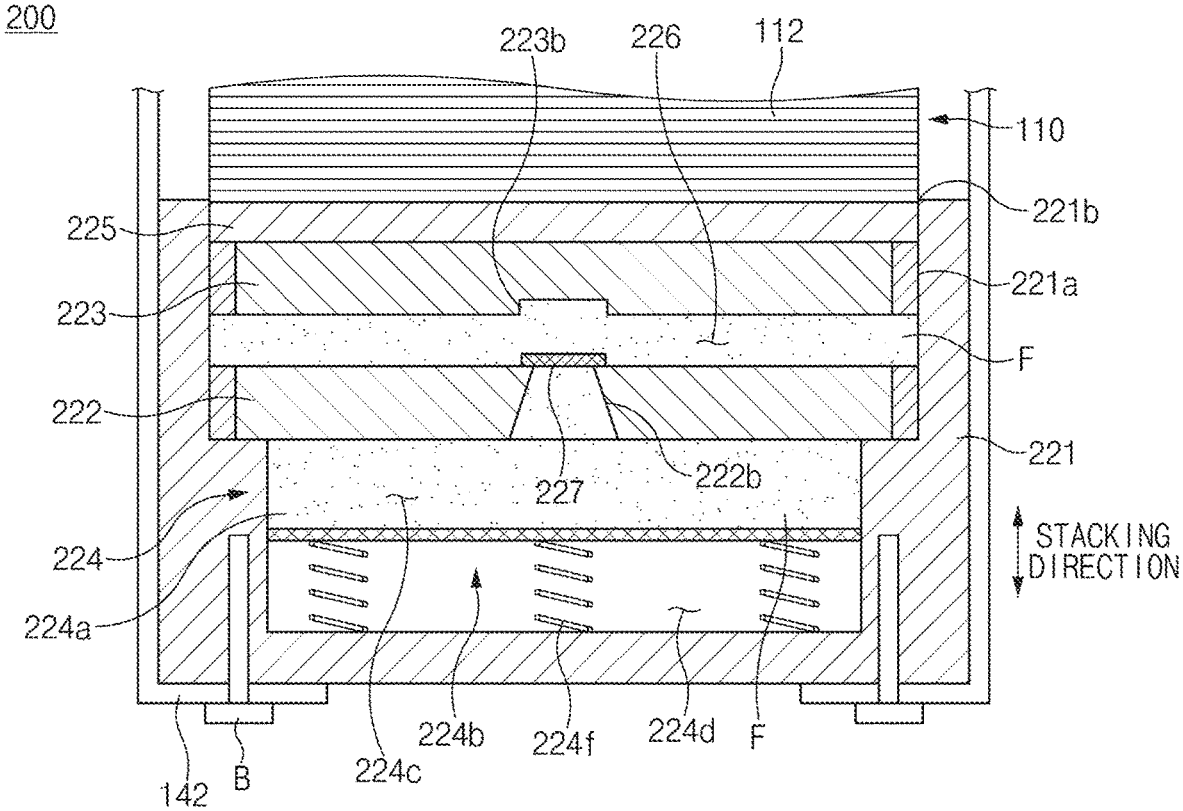
FIG. 7 is a view for explaining a method of increasing a surface pressure of unit cells using a surface pressure adjustment unit illustrated in FIG. 6 according to a second exemplary embodiment of the present disclosure.

FIG. 6 is a partial cross-sectional view of a fuel cell stack according to a second exemplary embodiment of the present disclosure, and FIG. 7 is a view illustrating a method of increasing a surface pressure of unit cells using a surface pressure adjustment unit illustrated in FIG. 6. Referring to FIG. 6, a fuel cell stack 200 according to the second exemplary embodiment of the present disclosure is different from the above-mentioned fuel cell stack 100 in that a structure of a surface pressure adjustment unit 220 is changed to maintain a surface pressure of unit cells 112 using a pressure of a fluid F even when a current is not applied to electromagnets 222 and 223 and thus the electromagnets 222 and 223 may be stopped. Hereinafter, the fuel cell stack 200 will be described based on the surface pressure adjustment unit 220.

The surface pressure adjustment unit 220 may include a housing 221 having an accommodation space 221a formed therein and fixedly installed to the first surface of a cell laminate 110, a first electromagnet 222 fixedly installed in the accommodation space 221a of the housing 221, a second electromagnet 223 installed to be slidably moved in a stacking direction in the accommodation space 221a of the housing 221 to be positioned between the first electromagnet 222 and the first surface of the cell laminate 110, a fluid chamber 224 disposed between the first electromagnet 222 and an inner side surface of the housing 221 and having an internal space 224a filled with the fluid F, a pressurizing plate 225 installed to be slidably moved in the stacking direction in the accommodation space 221a of the housing 221 to be positioned between the second electromagnet 223 and the first surface of the cell laminate 110, and the like.

As illustrated in FIG. 6, the housing 221 may have the accommodation space 221 formed therein, an opening 221b allowing the accommodation space 221a to be opened toward the first surface of the cell laminate 110, a screw bore 221c for screw-coupling a fastening member 140 and the housing 221 to each other, and the like. The accommodation space 221a may have a predetermined volume in which components of the surface pressure adjustment unit 220 such as the first electromagnet 222, the second electromagnet 223, the fluid chamber 224, the pressurizing plate 225, and the like, may be installed.

The opening 221b may have a predetermined caws-sectional area to allow a first end portion of the cell laminate 110 including the first surface of the cell laminate 110 to be inserted into the accommodation space 221a through the opening 221b to be slidably moved in the stacking direction. A screw thread capable of being screw-coupled to a screw part S of a bolt B is formed on an inner peripheral surface of the screw aperture 221c. The screw aperture 221c as described above is screw-coupled to the screw part S of the bolt B, to fix the housing 221 in a state in which the first end portion (e.g., one end portion) of the cell laminate 110 is inserted into the opening 221b.

As illustrated in FIG. 6, the first electromagnet 222 may be fixedly installed in the accommodation space 221a to be positioned between the fluid chamber 224 and the first surface of the cell laminate 110. For example, the first electromagnet 222 may be inserted into and coupled to a fixation frame 222a fixedly installed in the accommodation space 221a to be positioned between the fluid chamber 224 and the East surface of the cell laminate 110. The first electromagnet 222 as described above may have a connection aperture 222b punctured in the stacking direction to connect an intermediate space 226 between the electromagnets 222 and 223 to an internal space 224a of the fluid chamber 224 to be described below.

As illustrated in FIG. 7, the intermediate space 226 between the electromagnets 222 and 223 refers to a space formed between the electromagnets 222 and 223 when the second electromagnet 223 is spaced apart from the first electromagnet 222 by repulsive force acting between the electromagnets 222 and 223. The fluid F filled in the internal space 224a of the fluid chamber 224 may be introduced into the intermediate space 226 between the electromagnets 222 and 223 through the connection aperture 222b. Movement of the fluid F through the connection aperture 222b as described above will be descried in detail below.

As illustrated in FIG. 6, the second electromagnet 223 may be installed to be slidably moved in the stacking direction in the accommodation space 221a to be positioned between the first electromagnet 222 and the first surface of the cell laminate 110. For example, the second electromagnet 223 may be inserted into and coupled to a fixation frame 223a installed to be slidably moved in the stacking direction between the first electromagnet 222 and the first surface of the cell laminate 110. As illustrated in FIGS. 6 and 7, the second electromagnet 223 as described above may be slid and moved in the stacking direction to be directed toward the cell laminate 110 or toward an opposite side of the cell laminate 110 by attractive force and repulsive force acting between the electromagnets 222 and 223.

As illustrated in FIG. 6, the fluid chamber 224 may include the internal space 224a filled with the fluid F and a pressurizing member 224b configured to elastically pressurize the fluid F filled in the internal space 224a. The internal space 224a may be formed between the first electromagnet 222 and the inner side surface of the housing 221. A partition plate 224e of a pressurizing member 224b to be described below may partition the internal space 224a into a first internal space 224c that communicates with the connection aperture 222b of the first electromagnet 222 and a second internal electrode 224d that is blocked from being connected to the connection aperture 222b of the first electromagnet 222 by the partition plate 224e.

Additionally, in the first internal space 224c, a portion of the first internal space 224c may communicate with the connection aperture 222b of the first electromagnet 222 and a remaining portion thereof may be closed. The fluid F may be filled in the first internal space 224c as described above. The type of fluid F is not particularly limited. For example, the fluid F may be a mineral oil based working fluid, a synthetic oil based working fluid, a frame retardant working fluid, or the like. The mineral oil based working fluid is prepared by adding a corrosion inhibitor, an anti-wearing agent, and the like, to purified lubricating oil, but is not limited thereto. The frame retardant working fluid may be ester phosphate, polyol ester, or the like.

The pressurizing member 224b may include the partition plate 224e installed to be slidably moved in the stacking direction in the internal space 224a to partition the internal space 224a into the first and second internal spaces 224c and 224d, an elastic member 224f configured to elastically support the partition plate 224e, and the like. The partition plate 224e may be provided to prevent the fluid F filled in the first internal space 224c from leaking to the second internal space 224d through a gap between the partition plate 224e and the inner side surface of the housing 221. Accordingly, an O-ring (not illustrated) may be installed at a circumference of the partition plate 224e.

The elastic member 224f may be configured to elastically pressurize the partition plate 224e as described above. For example, as illustrated in FIG. 6, the elastic member 224f may be a compression coil spring interposed between the partition plate 224e and the inner side surface of the housing 221 to elastically pressurize the partition plate 224e. The number of installed elastic member 224f is not particularly limited, and at least one elastic member 224f may be installed depending on environmental conditions such as an area of the partition plate 224e, a load of the fluid F, and the like. The elastic member 224f as described above may elastically pressurized the fluid F filled in the first internal space 224c through the mediation of the partition plate 224e. Therefore, a predetermined pressure may be applied to the fluid F filled in the first internal space 224c in proportion to elastic force applied from the elastic member 224f.

Figure 8:
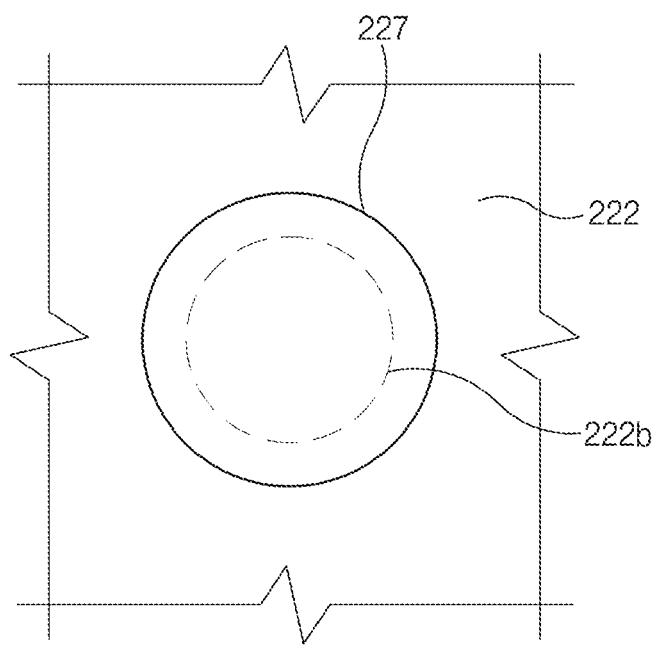
FIG. 8 is a plan view of an opening/closing valve illustrated in FIG. 6 according to a second exemplary embodiment of the present disclosure.
Figure 9:
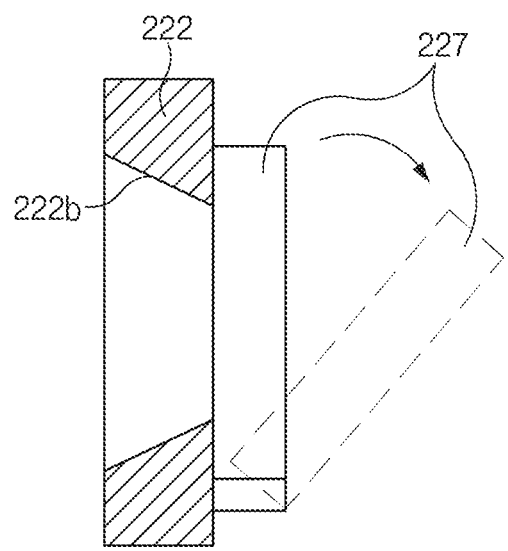
FIG. 9 is a conceptual view illustrating the principle of opening and closing the opening/closing valve illustrated in FIG. 6 according to a second exemplary embodiment of the present disclosure.

FIG. 8 is a plan view of an opening/closing valve illustrated in FIG. 6, and FIG. 9 is a conceptual view illustrating the principle of opening and closing the opening/closing valve illustrated in FIG. 6. As illustrated in FIG. 6, the pressurizing plate 225 may be installed to be slidably moved in the stacking direction in the accommodation space 221a to be positioned between the second electromagnet 223 and the first surface of the cell laminate 110. As illustrated in FIG. 7, when the second electromagnet 223 is slid and moved toward the cell laminate 110 by repulsive force acting between the electromagnets 222 and 223, the pressurizing plate 225 may be pressurized by the second electromagnet 223 to be slid and moved toward the cell laminate 110. Therefore, the pressurizing plate 225 may increase the surface pressure of the unit cells 112 by pressurizing the first surface of the cell laminate 110 by pressurizing force applied from the second electromagnet 223.

Meanwhile, as described above, the fluid F filled in the first internal space 224a is pressurized by the pressurizing member 224b. Therefore, when the second electromagnet 223 is slid and moved to be spaced apart from the first electromagnet 222, the fluid F may be introduced into the intermediate space 226 between the electromagnets 222 and 223 through the connection aperture 222b of the first electromagnet 222 by the pressure applied thereto. The surface pressure adjustment unit 220 may further include an opening/closing valve 227 configured to open or close the connection aperture 222b to adjust a flow of the fluid F through the connection aperture 222b as described above.

As illustrated in FIGS. 6 and 8, the opening/closing valve 227 may have a cross-sectional area greater than that of the connection aperture 222b and may be mounted on a first surface of the first electromagnet 222 facing the first surface of the second electromagnet 223 to open and close the connection aperture 222b. More specifically, a first end portion of the opening/closing valve 227 may be fixed to the first surface of the first electromagnet 222, and a second portion of the opening/closing valve 227 except for the first end portion thereof may be separated from one surface of the first electromagnet 222. The opening/closing valve 227 may be formed to be elastically deformed by a pressure applied from the fluid F. For example, as illustrated in FIG. 9, the opening/closing valve 227 may be elastically deformed in a direction opposite to a direction in which the pressure is applied when the pressure applied from the fluid F is equal to or greater than a predetermined reference pressure. A predetermined reference pressure is not specifically limited. For example, the predetermined reference pressure for an opening/closing valve 227 to open in 2 mm may be around 6.3 MPa, if the opening/closing valve 227 has a form of disk with 20 min diameter and 2 mm thickness; is made of SUS316L material; and is installed to be pressured by fluid F which is filled in a first internal space 224a as an area of a circle having 10 mm diameter.

Further, as illustrated in FIG. 6, the opening/closing valve 227 may be selectively supported by the first surface of the second electromagnet 223 when a spaced distance between the electromagnets 222 and 223 is less than a predetermined reference distance. Accordingly, the second electromagnet 223 may have a support groove 223b having a shape that corresponds to the opening/closing valve 227 to accommodate the opening/closing the valve 227 therein and configured to apply pressure to an upper surface of the opening/closing valve 227 to support the opening/closing valve 227 when the electromagnets 222 and 223 are disposed closely to each other (e.g., when the electromagnets are abutting).

When the electromagnets 222 and 223 abut each other, the opening/closing valve 227 may be pressurized or pushed toward the cell laminate 110 by a fluid pressure of the fluid F introduced into the connection aperture 222b. However, as illustrated in FIG. 6, since the upper surface of the opening/closing valve 227 is supported by the support groove 223b, a state in which the connection aperture 222b is closed may be maintained. However, when the second electromagnet 223 is spaced apart from the first electromagnet 222 to release the support of the opening/closing valve 227 by the support groove 223b as illustrated in FIG. 7, the opening/closing valve 227 may be elastically deformed toward the cell laminate 110 by the fluid pressure of the fluid F introduced into the connection aperture 222b based on a first end portion thereof fixed to a first surface of the first electromagnet 222.

In particular, the connection aperture 222b may be opened, and the fluid F filled in the first internal space 224c may be introduced into the intermediate space 226 between the electromagnets 222 and 223 through the connection aperture 222b. Then, the partition plate 224e may be slid and moved toward the cell laminate 110 by the elastic member 224f by a distance that corresponds to an amount of the fluid F discharged from the first internal space 224c. As illustrated in FIG. 7, when introduction of the fluid F into the intermediate space 226 between the electromagnets 222 and 223 is complete, the opening/closing valve 227 may be elastically recovered to an original state, to close the connection aperture 222b again. Particularly, since the opening/closing valve 227 has a clubs-sectional area greater than that of the connection aperture 222b, even though the opening/closing valve 227 is pressurized or pushed toward the opposite side of the cell laminate 110 by the fluid F introduced into the intermediate space 226 between the electromagnets 222 and 223, the opening/closing valve may be supported by the first surface of the first electromagnet 222, to maintain a closed state of the connection aperture 222b is closed may be maintained as it.

A controller 150 may be configured to operate the surface pressure adjusting unit 220 as described above to adjust the surface pressure of the unit cells 112 to become a predetermined reference surface pressure. For example, the controller 150 may be configured to adjust the surface pressure of the unit cells 112 to the reference surface pressure by applying a current to the electromagnets 222 and 223 to slide and move the second electromagnet 223 and the pressurizing plate 225 toward the cell laminate 110 and apply pressurizing force to the first surface of the cell laminate 110 when a surface pressure of the unit cells 112 measured by a surface pressure measuring sensor is decreased to be less than the predetermined reference surface pressure. In particular, after the opening/closing valve 227 is elastically deformed to open the connection aperture 222b by the pressure of the fluid F filled in the first internal space 224c, when introduction of the fluid F into the intermediate space 226 between the electromagnets 222 and 223 is completed, the opening/closing valve 227 may be elastically recovered to an original state, to thus close the connection aperture 222b again.

However, even though the current applied to the electromagnets 222 and 223 is blocked and thus the electromagnets 222 and 223 are stopped, the fluid F introduced into the intermediate space 226 between the electromagnets 222 and 223 may remain in the intermediate space 226 between the electromagnets 222 and 223, and thus, the surface pressure of the unit cells 112 may be maintained to be the reference surface pressure. Therefore, the fuel cell stack 200 may maintain the surface pressure of the unit cells 112 as the reference surface pressure using the pressure of the fluid F even when operating the electromagnets 222 and 223 for a predetermined period of time and stopping the operation of the electromagnets 222 and 223 instead of continuously operating the electromagnets 222 and 223 when there is a need to adjust the surface pressure of the unit cells 112. Therefore, the fuel cell stack 200 may decrease a power amount required to adjust the surface pressure of the unit cells 112, thereby making it possible to improve fuel efficiency of a fuel cell system.

Figure 10:
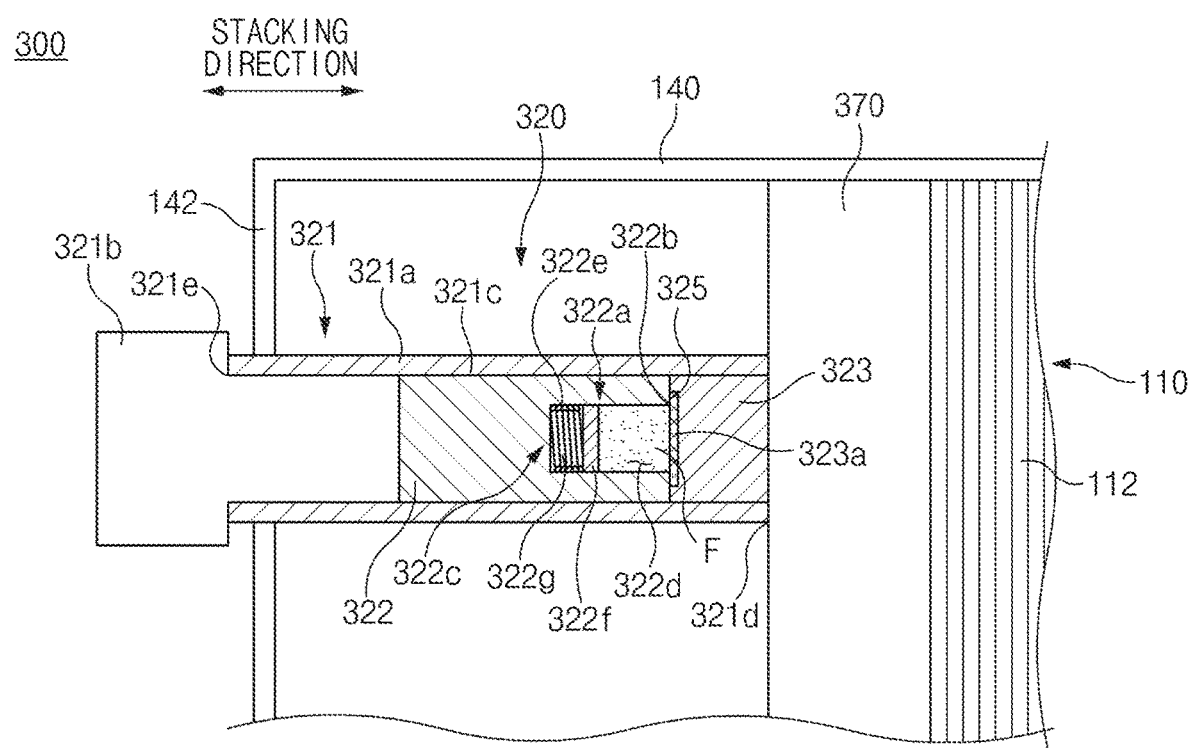
FIG. 10 is a partial cross-sectional view of a fuel cell stack according to a third exemplary exemplary embodiment of the present disclosure.
Figure 11:
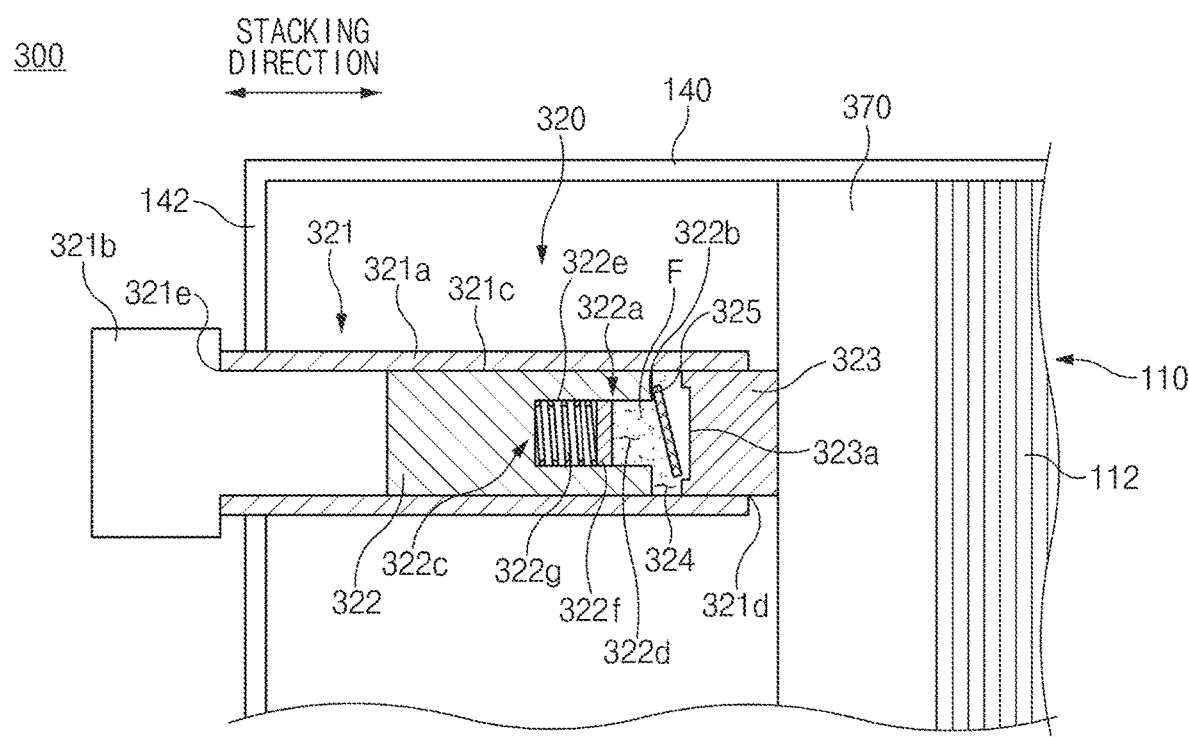
FIGS. 11 and 12 are views illustrating a method of increasing a surface pressure of the unit cells using a surface pressure adjustment unit illustrated in FIG. 10 according to a third exemplary embodiment of the present disclosure.
Figure 12:
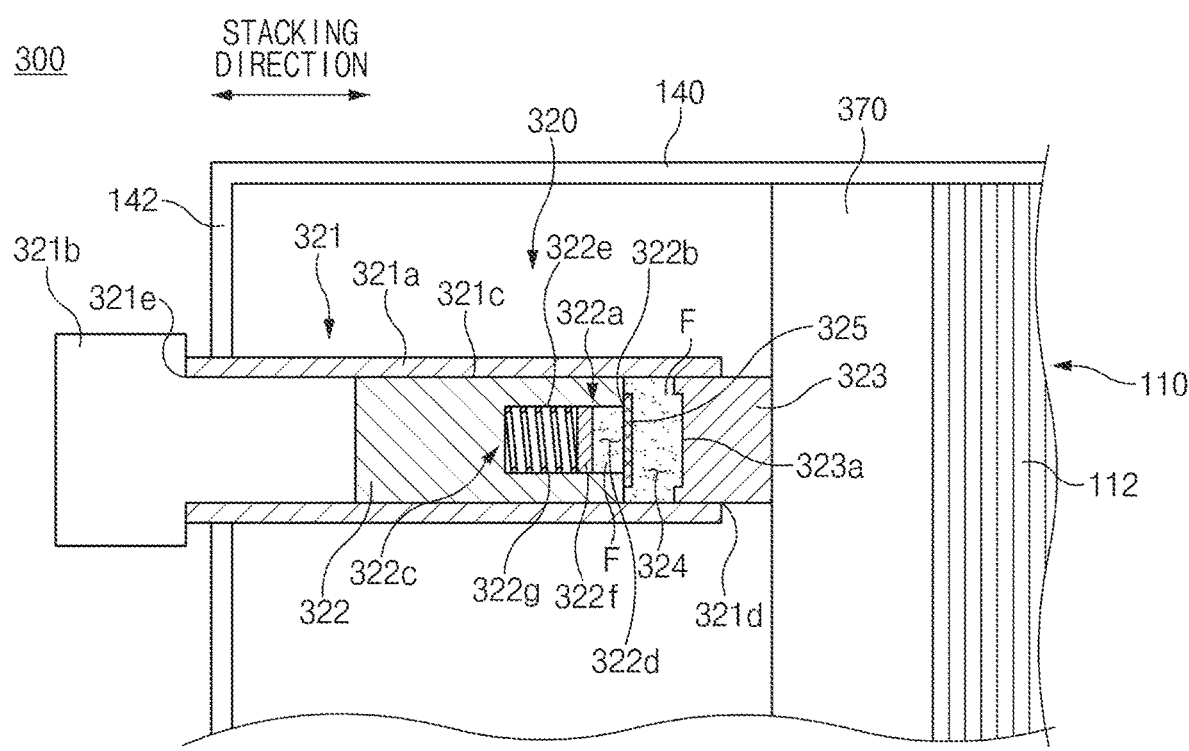

FIG. 10 is a partial cross-sectional view of a fuel cell stack according to a third exemplary embodiment of the present disclosure, and FIGS. 11 and 12 are views illustrating a method of increasing a surface pressure of unit cells using a surface pressure adjustment unit illustrated in FIG. 10. A fuel cell stack 300 according to the third exemplary embodiment of the present disclosure is different from the above-mentioned fuel cell stack 200 in that a shape of a surface pressure adjustment unit 320 is changed. Hereinafter, the fuel cell stack 300 will be described based on the surface pressure adjustment unit 320.

Referring to FIG. 10, the fuel cell stack 300 may include an end plate 370 stacked on the first surface of a cell laminate 110. The surface pressure adjustment unit 320 may be coupled to a fastening member 140 to apply pressurizing force to the end plate 370 as described above in a stacking direction. Accordingly, the surface pressure adjustment unit 320 may have a shape of a screw coupled to the fastening member 140. For example, the surface pressure adjustment unit 320 may include a housing 321 inserted into and fixed to a screw bore 146 of the fastening member 140, a first electromagnet 322 fixedly installed to an accommodation space 321c of the housing 321, a second electromagnet 323 installed to be slidably moved in the stacking direction in the accommodation space 321c of the housing 321, and the like.

As illustrated in FIG. 10, the housing 321 may include a body 321a coupled to the screw bore 146 of the fastening member 140 and a flange 321b coupled to a first side of the body 321a. The body 321a may include a screw thread (not illustrated) formed on an outer peripheral surface thereof to be screw-coupled to the screw aperture 146 of the fastening member 140, the accommodation space 321c formed therein, a first opening 321d formed at a first end portion of the housing 321 to open the accommodation space 321c toward the cell laminate 110, and a second opening 321e formed at a second end portion of the housing 321 to open the accommodation space 321c toward the opposite side of the cell laminate 110. The body 321a may have a cylindrical shape, but the shape of the body 321a is not limited thereto.

As illustrated in FIG. 10, the body 321a as described above may be screw-coupled to the screw bore 146 of the fastening member 140 to be coupled to the fastening member 140 so that the first end portion thereof comes in contact with the end plate 370. The flange 321b may have a diameter greater than that of the screw bore 146 of the fastening member 140. The flange 321b may have an insertion part formed to be inserted into the accommodation space 321c through the second opening 321e. The insertion part may have a screw thread formed on an outer peripheral surface thereof, and the accommodation space 321c may have a screw thread formed on an inner peripheral surface thereof to be screw-coupled to the screw thread of the insertion part.

Therefore, the flange 321b may be coupled to the first side of the body 321a to be positioned outside of the fuel cell stack 300 compared to the fastening member 140 by screw-coupling the screw thread of the insertion part and the screw thread of the accommodation space 321c to each other.

The first electromagnet 322 may be fixedly installed in the accommodation space 321c to be positioned between the insertion part of the flange 321b and the end plate 370. The first electromagnet 322 may have an internal space 322a filled with a fluid F, a connection aperture 322b that allows the internal space 322a to be opened toward the cell laminate 110, and a pressurizing member 322c configured to elastically pressurize the fluid F filled in the internal space 322a. The internal space 322a may be partitioned into a first internal space 322d that communicates with the connection aperture 322b and a second internal space 322e blocked from being connected to the connection aperture 322b by a partition plate 322f to be described below. The fluid F may be filled in the first internal space 322d. The pressurizing member 322c may have an elastic member 322g that allows the partition plate 322f to be elastically biased to partition the internal space 322a into the first and second internal spaces 322d and 322e, and the like.

The second electromagnet 323 may be installed to be slidably moved in the stacking direction in the accommodation space 321c to be positioned between the first electromagnet 322 and the end plate 370. As illustrated in FIG. 10, the second electromagnet 323 may have a predetermined cross-sectional area to be led or guided from the accommodation space 321c through the first opening 3211 Further, the second electromagnet 323 may have a predetermined length. In particular, when a first surface of the second electromagnet 323 abuts the first surface of the first electromagnet 322, the second surface of the second electromagnet 323 may be positioned on the same line as the first opening 321d of the body 321a. As illustrated in FIGS. 11 and 12, the second electromagnet 323 may be slid and moved in the stacking direction to be directed toward the cell laminate 110 or toward an opposite side of the cell laminate 110 by attractive force and repulsive force acting between the electromagnets 322 and 323.

When the second electromagnet 323 as described above is slid and moved toward the cell laminate 110 by repulsive force acting between the electromagnets 322 and 323, the fluid F filled in the first internal space 322d may be introduced into an intermediate space 324 between the electromagnets 322 and 323 through the connection aperture 322b. The surface pressure adjustment unit 320 may further include an opening/closing valve 325 configured to open or close the connection aperture 322b to adjust a flow of the fluid F through the connection aperture 322b as described above.

The opening/closing valve 325 is provided to be elastically deformed by a pressure of the fluid F and has an area larger than that of the connection aperture 322b to cover the connection aperture 322b. A first end portion of the opening/closing valve 325 as described above may be fixed to the first surface of the first electromagnet 322 to close the opening/closing valve 325 the connection aperture 322b. The second electromagnet 323 may include a support groove 323a having a shape that corresponds to the opening/closing valve 325 to accommodate the opening/closing valve 325 therein and configured to pressurize an upper surface of the opening/closing valve 325 to support the opening/closing valve 325 when the electromagnets 322 and 323 are disposed so that the first surface of the fast electromagnet 322 and the first surface of the second electromagnet 323 abut each other.

A controller 150 may be configured to operate the surface pressure adjusting unit 320 as described above to adjust the surface pressure of the unit cells 112 to become a predetermined reference surface pressure. For example, as illustrated in FIGS. 11 and 12, the controller 150 may be configured to adjust the surface pressure of the unit cells 112 to the reference surface pressure by applying a current to the electromagnets 322 and 323 to slide and move the second electromagnet 323 toward the cell laminate 110 and apply pressurizing force to the cell laminate 110 through the end plate 370 when a surface pressure of the unit cells 112 measured by a surface pressure measuring sensor 160 is decreased to be less than the predetermined reference surface pressure.

In particular, as illustrated in FIGS. 11 and 12, the fluid F filled in the first internal space 322d may be partially introduced into the intermediate space 324 between the electromagnets 322 and 323 while elastically deforming the opening/closing valve 325 to open the connection aperture 322b, and when introduction of the fluid F into the intermediate space 324 between the electromagnets 322 and 323 is complete, the opening/closing valve 325 may be elastically recovered to an original state to thus close the connection aperture 322b. Therefore, even though the current applied to the electromagnets 322 and 323 is blocked and thus the electromagnets 322 and 323 are stopped, the fluid F introduced into the intermediate space 324 between the electromagnets 322 and 323 may remain in the intermediate space 324 between the electromagnets 322 and 323, and thus the surface pressure of the unit cells 112 may be maintained at the reference surface pressure.

Figure 13:
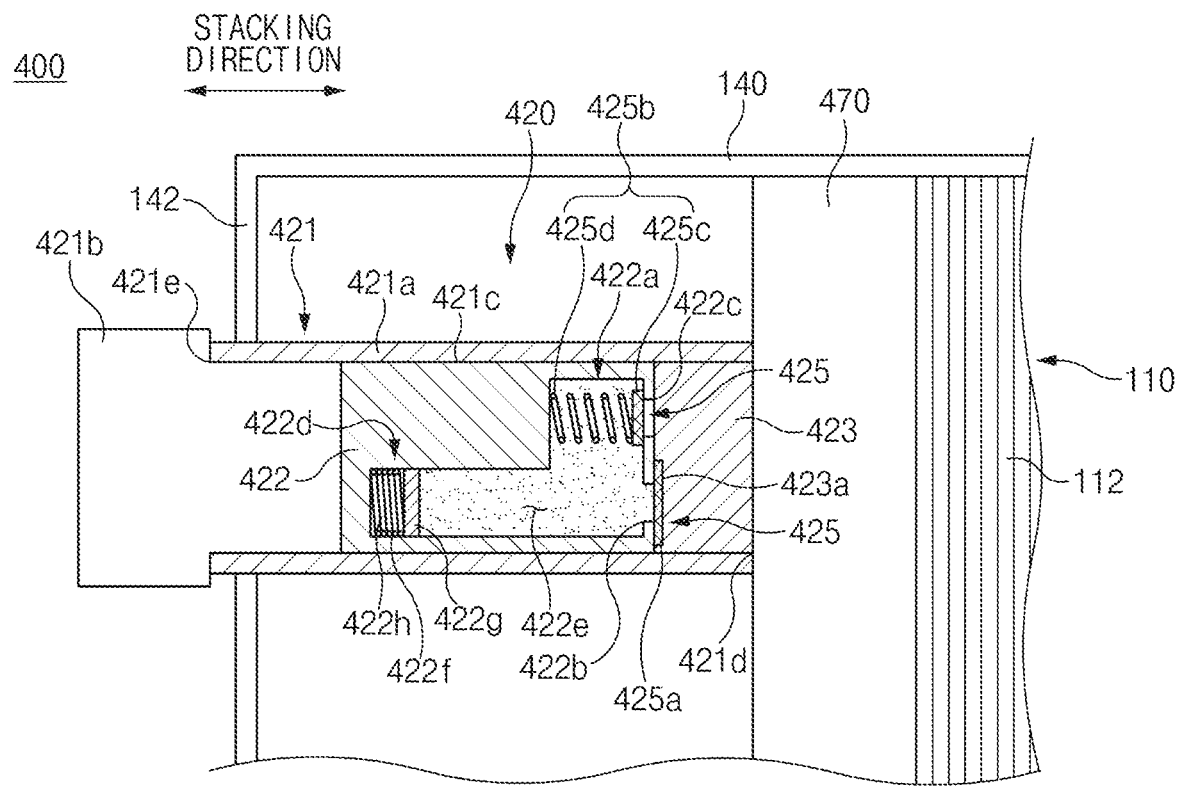
FIG. 13 is a partial cross-sectional view of a fuel cell stack according to a fourth exemplary embodiment of the present disclosure.
Figure 14:
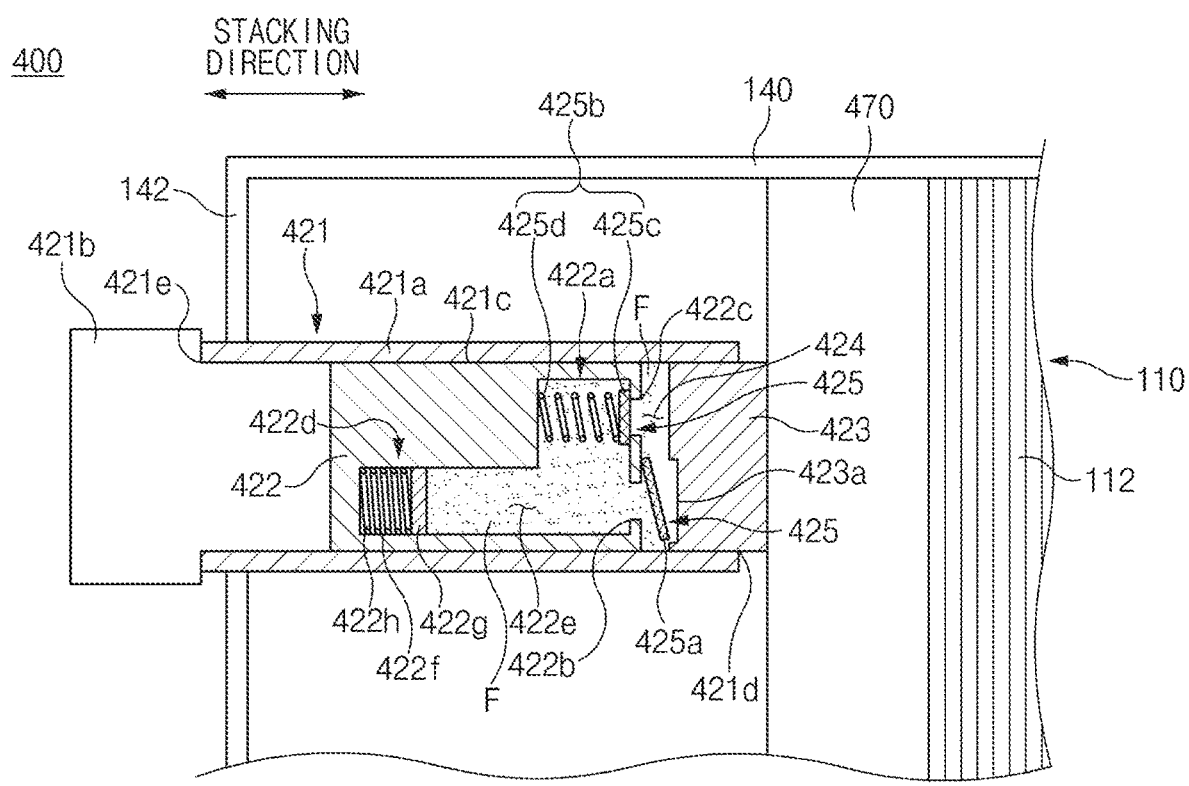
FIGS. 14 and 15 are views illustrating a method of increasing a surface pressure of unit cells using a surface pressure adjustment unit illustrated in FIG. 13 according to a fourth exemplary embodiment of the present disclosure.
Figure 15:
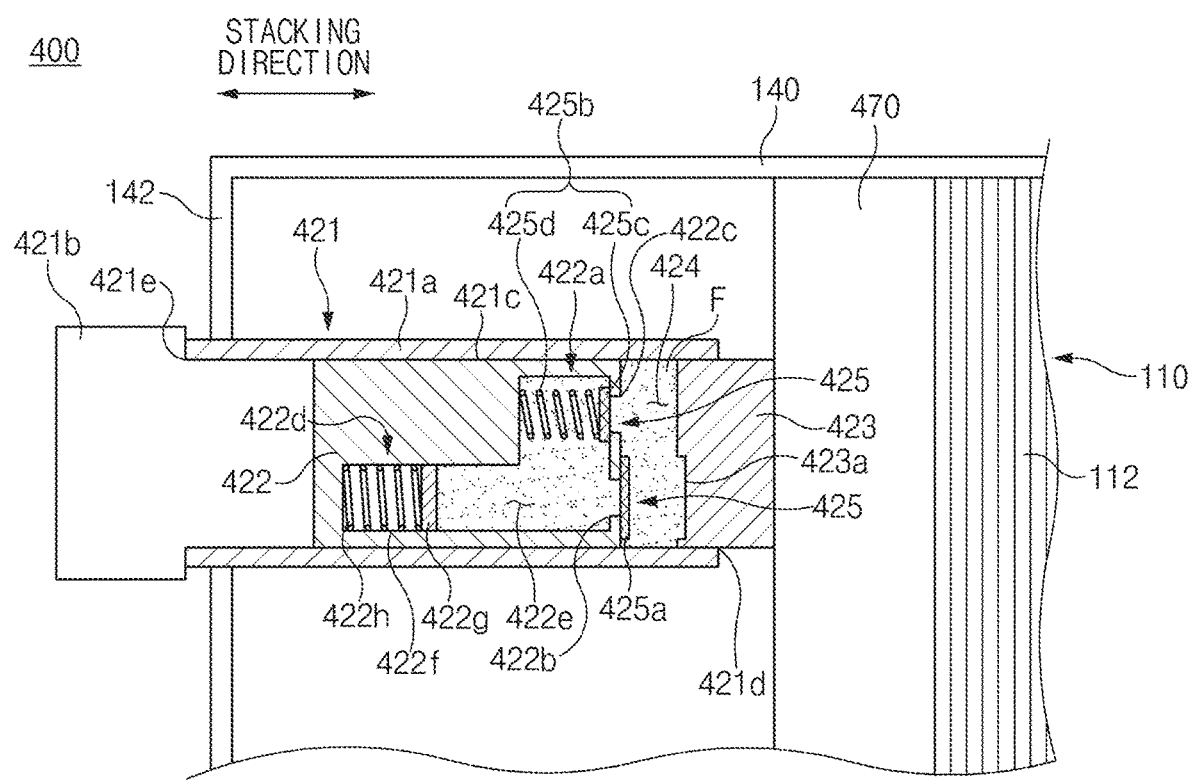
Figure 16:
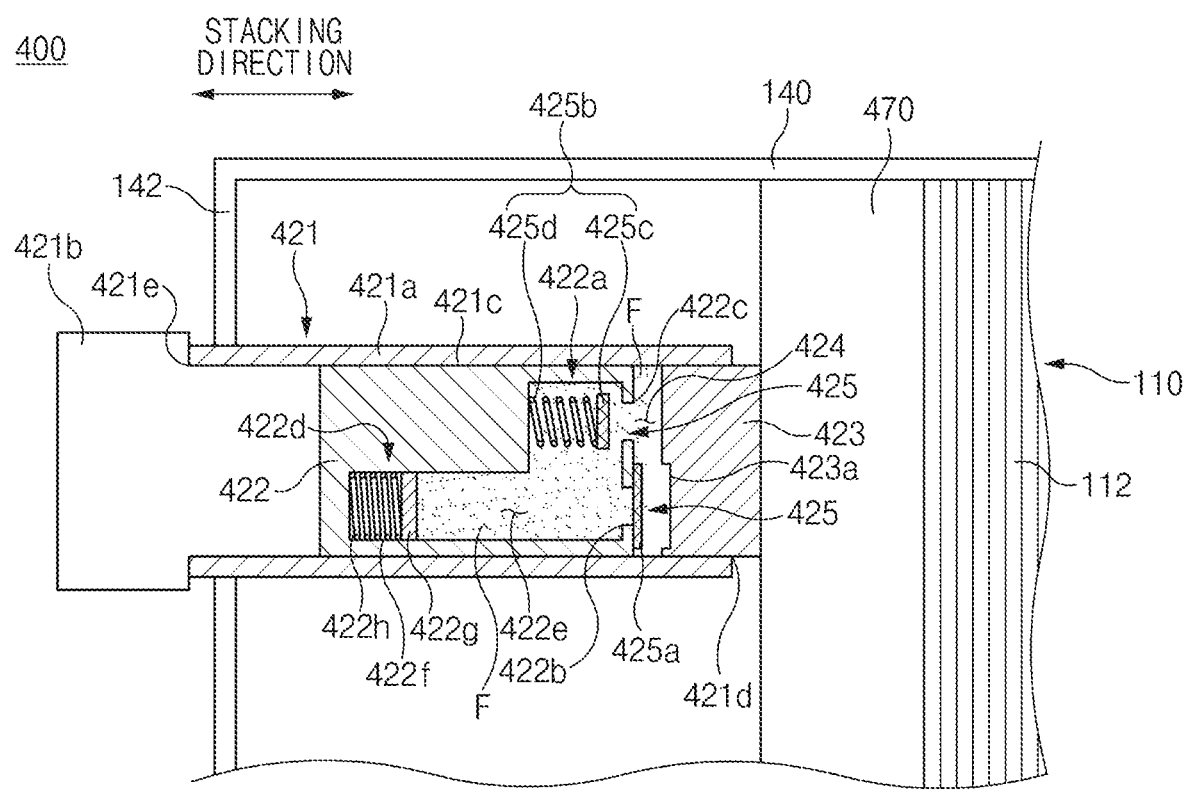
FIGS. 16 and 17 are views illustrating a method of decreasing the surface pressure of the unit cells using the surface pressure adjustment unit illustrated in FIG. 13 according to a fourth exemplary embodiment of the present disclosure.
Figure 17:
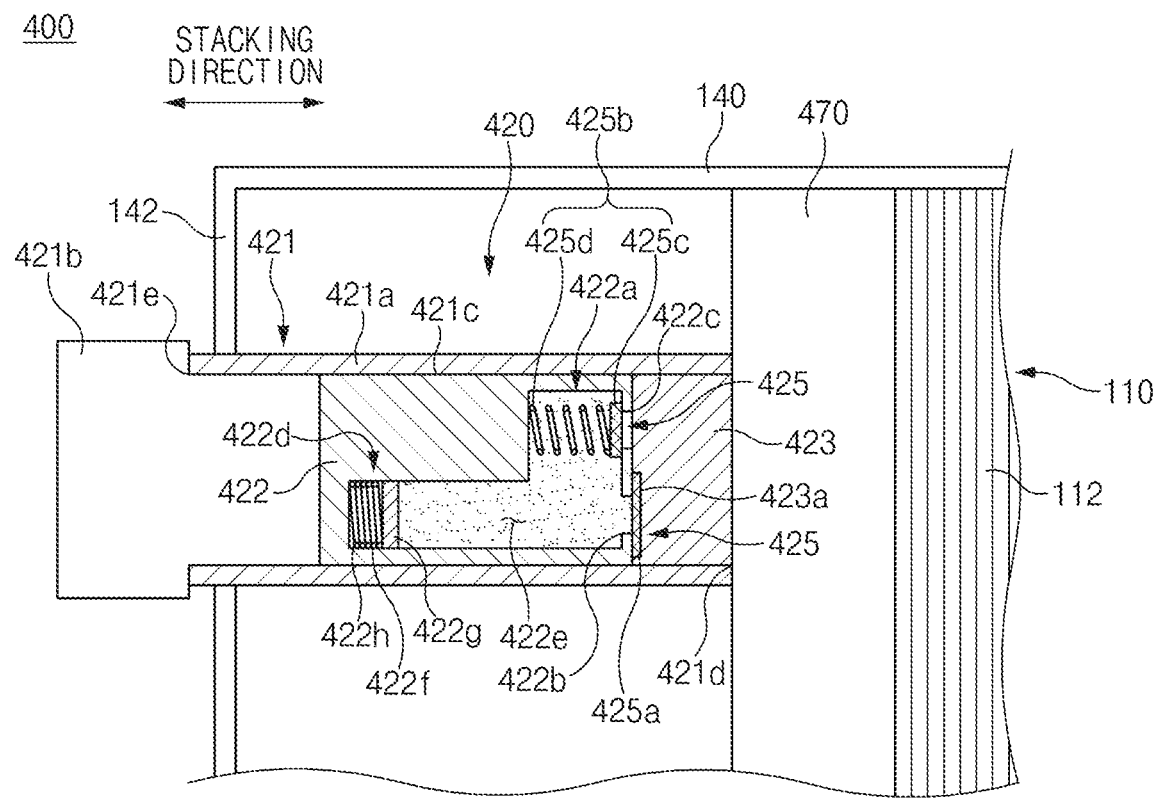

FIG. 13 is a partial cross-sectional view of a fuel cell stack according to a fourth exemplary embodiment of the present disclosure, FIGS. 14 and 15 are views illustrating a method of increasing a surface pressure of unit cells using a surface pressure adjustment unit illustrated in FIG. 13, and FIGS. 16 and 17 are views illustrating a method of decreasing the surface pressure of the unit cells using the surface pressure adjustment unit illustrated in FIG. 13.

A fuel cell stack 400 according to the fourth exemplary embodiment of the present disclosure is different from the above-mentioned fuel cell stack 300 in that a structure of a surface pressure adjustment unit 420 is changed to decrease a surface pressure of unit cells 112. Hereinafter, the fuel cell stack 400 will be described based on the surface pressure adjustment unit 420. A first electromagnet 422 may be fixedly installed in an accommodation space 421c of a housing 421. The first electromagnet 422 as described above may have an internal space 422a filled with a fluid F, first and second connection apertures 422b and 422c to open the internal space 422a toward a cell laminate 110, respectively, and a pressurizing member 422d configured to elastically pressurize the fluid F filled in the internal space 422a.

The internal space 422a may be partitioned into a first internal space 422e configured to communicate with the first and second connection apertures 422b and 422c and a second internal space 422f blocked from being connected to the connection apertures 422b and 422c by a partition plate 422g to be described below. The fluid F may be filled in the first internal space 422e. Each of the first and second connection apertures 422b and 422c may be formed to open the first internal space 422e toward the cell laminate 110. The pressurizing member 422d may include the partition plate 422g installed to be slidably moved in a stacking direction in the internal space 422a to partition the internal space 422a into the first and second internal spaces 422e and 422f, an elastic member 422h configured to elastically bias the partition plate 422g.

The second electromagnet 423 may be installed to be slidably moved in the stacking direction in the accommodation space 421c of the housing 421 to be positioned between the first electromagnet 422 and an end plate 470. The second electromagnet 423 as described above may be slid and moved in the stacking direction to be directed toward the cell laminate 110 or toward an opposite side of the cell laminate 110 by attractive force and repulsive force acting between the electromagnets 422 and 423. However, an intermediate space 424 between the electromagnets 422 and 423 may be connected to the first internal space 422e through the connection apertures 422b and 422c.

Therefore, while the second electromagnet 423 is slid and moved in the stacking direction to be directed toward the cell laminate 110 or toward the opposite side of the cell laminate 110, the fluid F may flow from the first internal space 422e to the intermediate space 424 between the electromagnets 422 and 423 or flow from the intermediate space 424 between the electromagnets 422 and 423 to the first internal space 422e through the connection apertures 422b and 422c. Therefore, the surface pressure adjustment unit 420 may further include an opening/closing valve 425 configured to selectively open or close each of the connection apertures 422b and 422c to adjust a flow of the fluid F through the connection apertures 422b and 422c.

The opening/closing valve 425 may include a first opening/closing valve 425a configured to open or close the first connection aperture 422b to allow the fluid F to flow from the first internal space 422e to the intermediate space 424 between the electromagnets 422 and 423 through the first connection aperture 422b, and a second opening/closing valve 425b configured to open or close the second connection aperture 422c to allow the fluid F to flow from the intermediate space 424 between the electromagnets 422 and 423 to the first internal space 422e through the second connection aperture 422c.

The first opening/closing valve 425a may be elastically deformed by a pressure of the fluid F and may have an area greater than that of the first connection aperture 422b to cover the first connection aperture 422b. The opening/closing valve 425 as described above may be fixed to the first surface of the first electromagnet facing the first surface of the second electromagnet 423 to close the first connection aperture 422b. In response, the second electromagnet 423 may include a support groove 423a having a shape that corresponds to the first opening/closing valve 425a to accommodate the first opening/closing valve 425a therein and configured to pressurize an upper surface of the first opening/closing valve 425a to support the first opening/closing valve 425a when the electromagnets 422 and 423 are disposed with the first surface of the first electromagnet 422 and the first surface of the second electromagnet 423 abut each other.

The second opening/closing valve 425c may include a cover plate 425c having an area greater than that of the second connection aperture 422c to cover the second connection aperture 422c and installed in the first internal space 422e, and an elastic member 425d elastically configured to pressurize the cover plate 425c toward an inner side surface of the first internal space 422e to cause the cover plate 425c to abut the inner surface of the first internal space 422e when the cover plate 425c covers the second connection aperture 422c. Particularly, the elastic member 425d may be formed to push the cover plate 425c toward the opposite side (e.g., second side) of the cell laminate 110 by a pressure of the fluid F introduced into the intermediate space 424 between the electromagnets 422 and 423 when the pressure of the fluid F introduced into the intermediate space 424 between the electromagnets 422 and 423 is greater than a pressure of the fluid F filled in the first internal space 422e by a predetermined pressure. The elastic member 425d may be a compression coil spring, but the elastic member 425d is not limited thereto.

Hereinafter, the method of increasing the surface pressure of the unit cells 112 using the surface pressure adjustment unit 420 will be described with reference to FIGS. 14 and 15. As illustrated in FIGS. 14 and 15, the controller 150 may be configured to adjust the surface pressure of the unit cells 112 to the reference surface pressure by applying a current to the electromagnets 422 and 423 to slide and move the second electromagnet 423 toward the cell laminate 110 and apply pressurizing force to the cell laminate 110 through the end plate 470 when a surface pressure of the unit cells 112 measured by a surface pressure measuring sensor 160 is decreased to be less than the predetermined reference surface pressure. In particular, the fluid F filled in the first internal space 422e may be partially introduced into the intermediate space between the electromagnets 422 and 423 while elastically deforming the first opening/closing valve 425a to open the first connection aperture 422b.

Further, when introduction of the fluid F into the intermediate space 424 between the first and second electromagnets 422 and 423 is completed and the pressure of the fluid F introduced into the intermediate space 424 between the electromagnets 422 and 423 and the pressure of the fluid F filled in the first internal space 422e are balanced with each other, the opening/closing valve 425a may be elastically recovered to an original state, and thus the first connection aperture 422b may be closed. In addition, since the cover pate 425c of the second opening/closing valve 425c is in a state in which the cover plate 425c is elastically pressurized by the elastic member 422h to be supported by the inner side surface of the first internal space 422e, the closed state of the second connection aperture 422c may be maintained. Therefore, even though the current applied to the electromagnets 422 and 423 is blocked and thus the electromagnets 422 and 423 are stopped, the fluid F introduced into the intermediate space 424 between the electromagnets 422 and 423 may remain in the intermediate space 424 between the electromagnets 422 and 423, and thus, the surface pressure of the unit cells 112 may be maintained at the reference surface pressure.

Hereinafter, the method of decreasing the surface pressure of the unit cells 112 using the surface pressure adjustment unit 420 will be described with reference to FIGS. 16 and 17. As described above, after the surface pressure of the unit cells 112 is increased up to a reference pressure by sliding and moving the second electromagnet 423 toward the cell laminate 110, the surface pressure of the unit cells 112 may be additionally increased by heat expansion of the fuel cell stack 400, to increase the surface pressure of the unit cells 112 to exceed the reference pressure. However, when the surface pressure of the unit cells 112 is increased to exceed the reference pressure, a polymer electrolyte membrane, a gas diffusion layer, and the like, may be excessively compressed, and thus, mechanical durability of the fuel cell stack 400 may deteriorate, or diffusion of gas and discharge of concentrated water may be inhibited.

Accordingly, the controller 150 may be configured to decrease the surface pressure of the unit cells 112 up to the reference surface pressure by applying the current to the electromagnets 423 and 423 to slide and move the second electromagnet 423 toward the opposite side (e.g., the second side) of the cell laminate 110 when the surface pressure of the unit cells 112 measured by the surface pressure measuring sensor 160 exceeds the reference surface pressure. As illustrated in FIG. 16, when the second electromagnet 423 is slid and moved toward the opposite side of the cell laminate 110 to abut the first electromagnet 422, the fluid F introduced into the intermediate space 424 between the electromagnets 422 and 423 may be pressurized by the second electromagnet 423.

Therefore, the fluid F introduced into the intermediate space 424 between the electromagnets 422 and 423 may pressurize the cover plate 425 toward the opposite side of the cell laminate 110 to compress an elastic member 425d of the second opening/closing valve 425c, to cause the cover plate 425c to be spaced apart from the inner side surface of the first internal space 422e. Then, the second connection aperture 422c may be opened, to allow the fluid F to flow from the intermediate space 424 between the electromagnets 422 and 423 to the first internal space 422e through the second connection aperture 422c. As illustrated in FIG. 17, when sliding movement of the second electromagnet 423 is stopped, the pressure of the fluid F introduced into the intermediate space 424 between the electromagnets 422 and 423 and the pressure of the fluid F filled in the first internal space 422e are balanced with each other, and the cover plate 425c may abut the inner side surface of the first internal space 422e by the elastic member 422h elastically recovered to an original state, thereby closing the second connection aperture 422c again. As described above, when the second electromagnet 423 is slid and moved toward the opposite side of the cell laminate 110 and the fluid F introduced into the intermediate space 424 between the electromagnets 422 and 423 may flow to the first internal space 422e, pressurizing force applied to the cell laminate 110 by the second electromagnet 423 or the fluid F may be decreased, to adjust the surface pressure of the unit cells 112 to the reference surface pressure.

Figure 18:
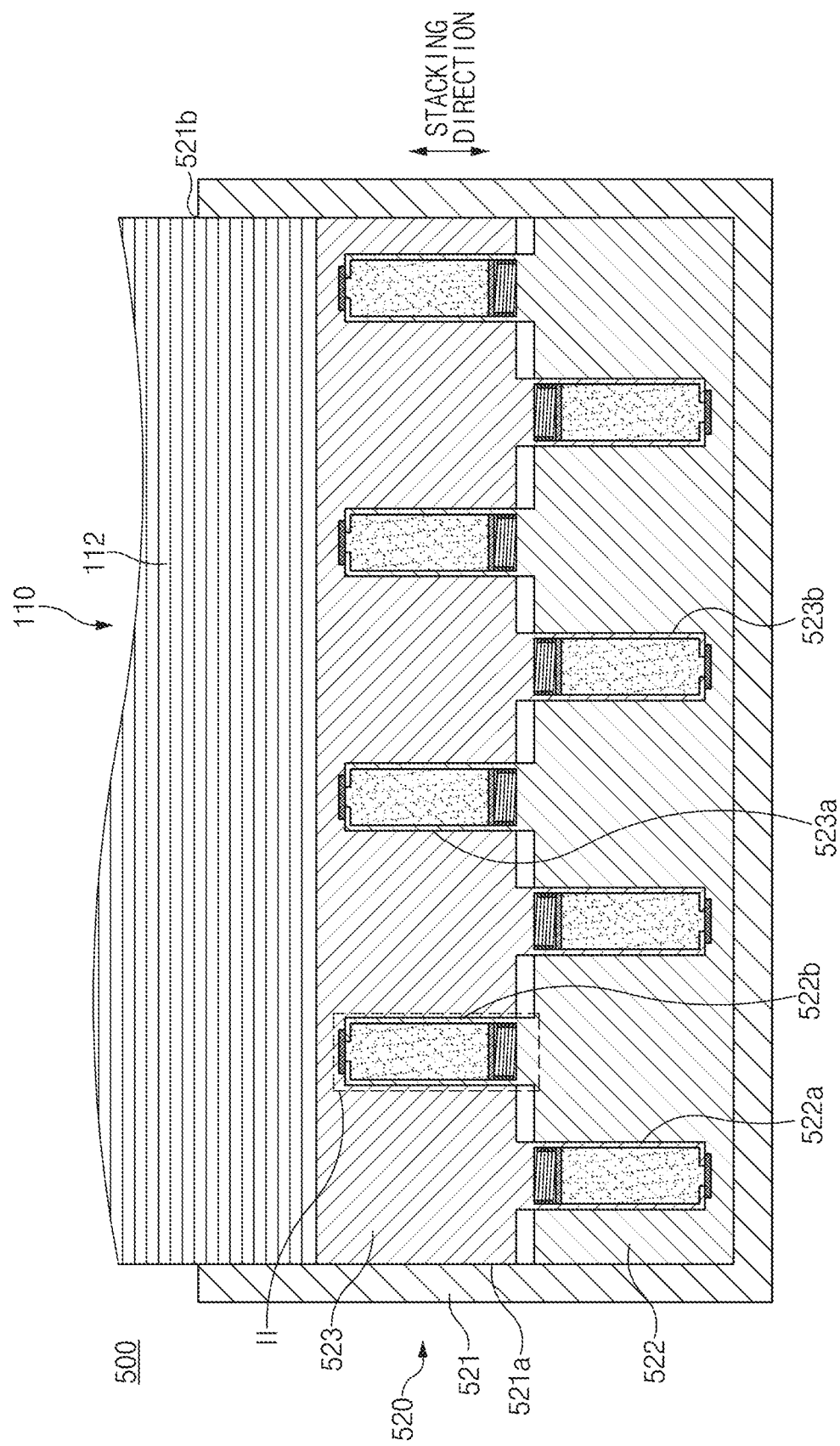
FIG. 18 is a partial clubs-sectional view of a fuel cell stack according to a fifth exemplary embodiment of the present disclosure.

FIG. 18 is a partial cross-sectional view of a fuel cell stack according to a fifth exemplary embodiment of the present disclosure. Referring to FIG. 18, a fuel cell stack 500 according to the fifth exemplary embodiment of the present disclosure is different from the above-mentioned fuel cell stack 200 in that an installation structure of a surface pressure adjustment unit 520 is changed Hereinafter, the fuel cell stack 500 will be described based on the surface pressure adjustment unit 520.

The surface pressure adjustment unit 520 may include a housing 521 having an accommodation space 521a formed therein and fixedly installed to one surface of a cell laminate 110, a first electromagnet 522 fixedly installed in the accommodation space 521a of the housing 521, a second electromagnet 523 installed to be slidably moved in a stacking direction in the accommodation space 521a of the housing 521 to be positioned between the first electromagnet 522 and the first surface of the cell laminate 110.

As illustrated in FIG. 18, the housing 521 may have the accommodation space 521a formed therein, an opening 521b allowing the accommodation space 521a to be opened toward the first surface of the cell laminate 110, and the like. The accommodation space 521a may have a predetermined volume to accommodate components of the surface pressure adjustment unit 520. The opening 521b may have a predetermined miss-sectional area to insert a first end portion of the cell laminate 110 including the first surface of the cell laminate 110 into the accommodation space 521a through the opening 521b to be slidably moved in the stacking direction.

As illustrated in FIG. 18, the first electromagnet 522 may include a guide groove 522a formed to be depressed in the stacking direction and a guide protrusion 522b formed to protrude in the stacking direction. The guide groove 522a may be formed to be depressed toward an opposite side of the cell laminate 110, and the guide protrusion 522b may be formed to protrude toward the cell laminate 110. The numbers of guide groove 522a and guide protrusion 522b are not particularly limited, and at least one guide groove 522a and at least one guide protrusion 522b may be alternately formed by a predetermined interval.

As illustrated in FIG. 18, the second electromagnet 523 may include a guide groove 523a formed to be depressed in the stacking direction and a guide protrusion 523b formed to protrude in the stacking direction. The guide groove 523a may be formed to be depressed toward the cell laminate 110 to insert the guide protrusion 522b of the first electromagnet 522 thereinto to be slidably moved in the stacking direction, and the guide protrusion 523b may be formed to protrude toward the opposite side of the cell laminate 110 to insert the guide protrusion 523b into the guide groove 522a of the first electromagnet 522 to be slidably moved in the stacking direction. The numbers of guide groove 523a and guide protrusion 523b are the same as the numbers of guide groove 522a and guide protrusion 522b of the first electromagnet 522.

The second electromagnet 523 as described above may be slid and moved in the stacking direction to be directed toward the cell laminate 110 or toward the opposite side of the cell laminate 110 by attractive force and repulsive force acting between the electromagnets 522 and 523. The second electromagnet 523 as described above may be slid and moved toward the cell laminate 110 to pressurize the first surface of the cell laminate 110, thereby increasing a surface pressure of unit cells 112.

Figure 19:
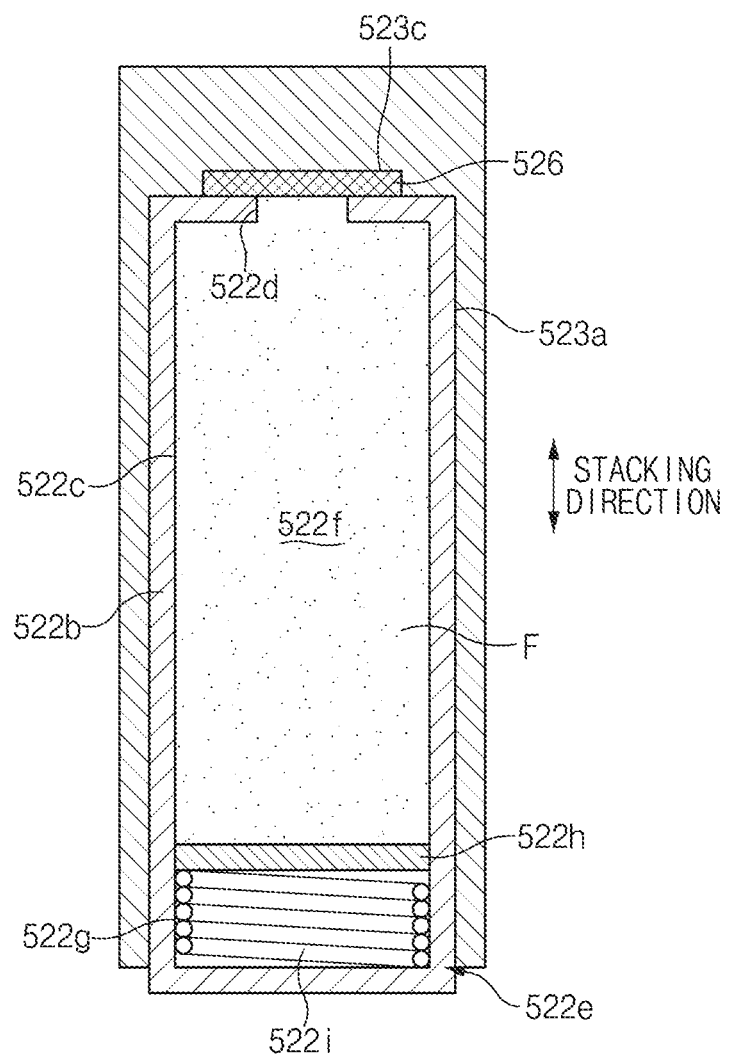
FIG. 19 is a partially enlarged view of part II of FIG. 18 according to a fifth exemplary embodiment of the present disclosure.

FIG. 19 is a partially enlarged view of part II of FIG. 18, and FIGS. 20 to 22 are views illustrating a method of increasing the surface pressure of the unit cells using the surface pressure adjusting unit illustrated in FIG. 19. The guide grooves 522a and 523a and the guide protrusions 522b and 523b of the above-mentioned electromagnets 522 and 523 may have a structure for maintaining the surface pressure of the unit cells 112 using a pressure of a fluid F even when the electromagnets 522 and 523 are stopped. For convenience of explanation, hereinafter, the guide protrusion 522b of the first electromagnet 522 and the guide groove 523a of the second electromagnet 523 into which the guide protrusion 522b of the first electromagnet 522 as described above may be inserted will be described. A description of the guide protrusion 522b of the first electromagnet 522 and the guide groove 523a of the second electromagnet 523 may be applied to the guide groove 522a of the first electromagnet 522 and the guide protrusion 523b of the second electromagnet 523 as it is.

The guide protrusion 522b may have an internal space 522c filled with the fluid F, a connection aperture 522d that allows the internal space 522c to be opened toward the cell laminate 110, and a pressurizing member 522e configured to elastically pressurize the fluid F filled in the internal space 522c. The internal space 522c may be partitioned into a first internal space 522f that communicates with the connection aperture 522d and a second internal space 522g blocked from being connected to the connection aperture 522d by a partition plate 522h to be described below. The fluid F may be filled in the lust internal space 522f.

The pressurizing member 522e may have the partition plate 522h installed to be slidably moved in the stacking direction in the internal space 522c to partition the internal space 522c into the first and second internal spaces 522f and 522g, an elastic member 224i allowing the partition plate 522h to be elastically biased, and the like. As the guide protrusion 522b is provided as described above, when the second electromagnet 523 is slid and moved toward the cell laminate 110 by repulsive force acting between the electromagnets 522 and 523, the fluid F filled in the first internal space 522f may be introduced into an intermediate space 525 between the guide protrusion 522b and the guide groove 523a through the connection aperture 522d. The surface pressure adjustment unit 520 may further include an opening/closing valve 526 configured to open or close the connection aperture 522d to adjust a flow of the fluid F through the connection aperture 522d.

The opening/closing valve 526 may be elastically deformed by a pressure of the fluid F and may have an area greater than that of the connection aperture 522d to cover the connection aperture 522d. A first end portion of the opening/closing valve 526 as described above may be fixed to an outer side surface of the guide protrusion 522b facing an inner side surface of the guide groove 523a to cause the opening/closing valve 526 to close the connection aperture 522d. In response, the guide groove 523a may have a support groove 523c having a shape that corresponds to the opening/closing valve 526 to accommodate the opening/closing valve 526 therein, and pressurize an upper surface of the opening/closing valve 526 to support the opening/closing valve 526 when the electromagnets 522 and 523 are disposed to cause the outer side surface of the guide protrusion 522b and the inner side surface of the guide groove 523a to abut each other.

Figure 20:
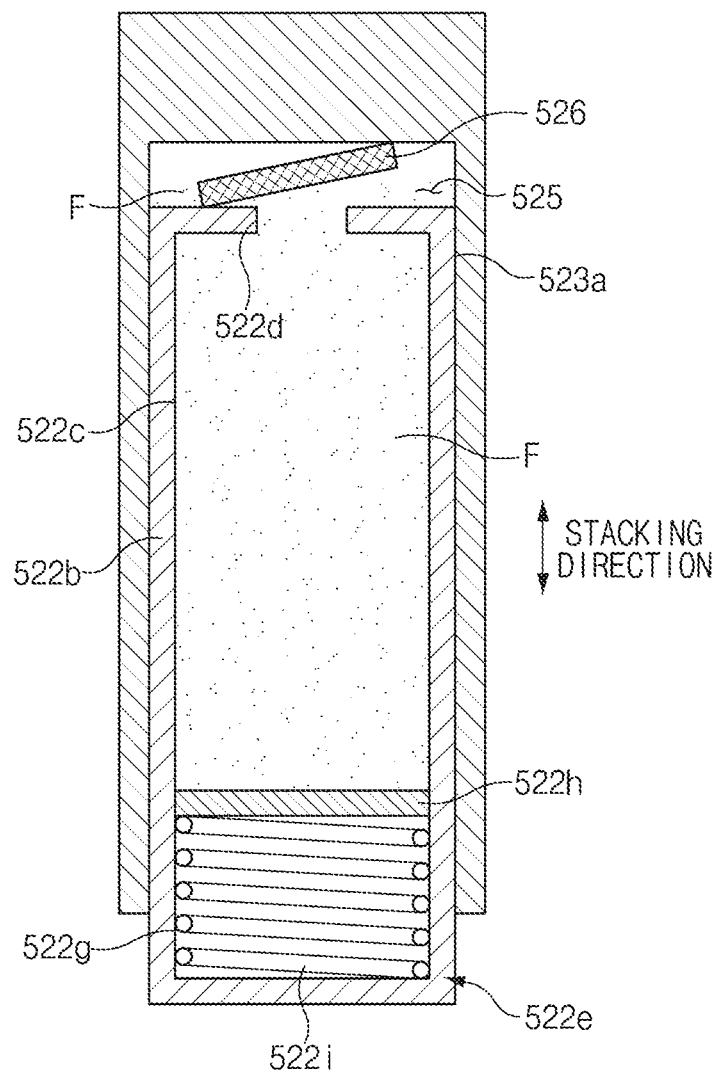
FIGS. 20 to 22 are views illustrating a method of increasing a surface pressure of unit cells using a surface pressure adjustment unit illustrated in FIG. 19 according to a fifth exemplary embodiment of the present disclosure.
Figure 21:
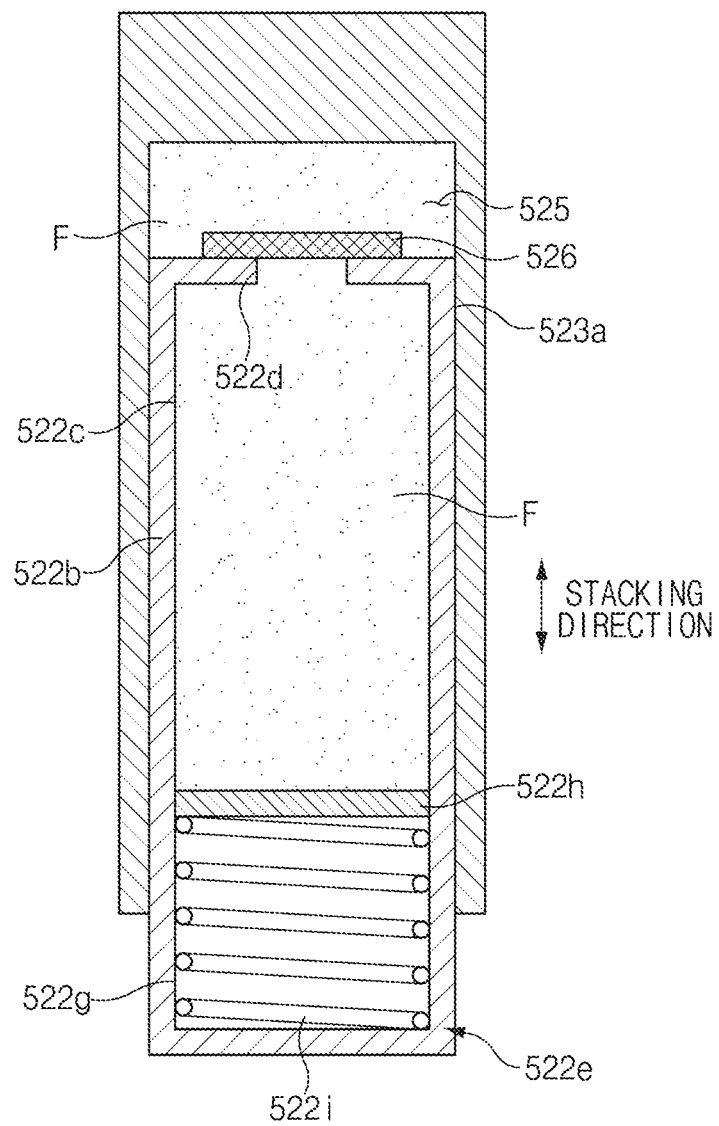
Figure 22:
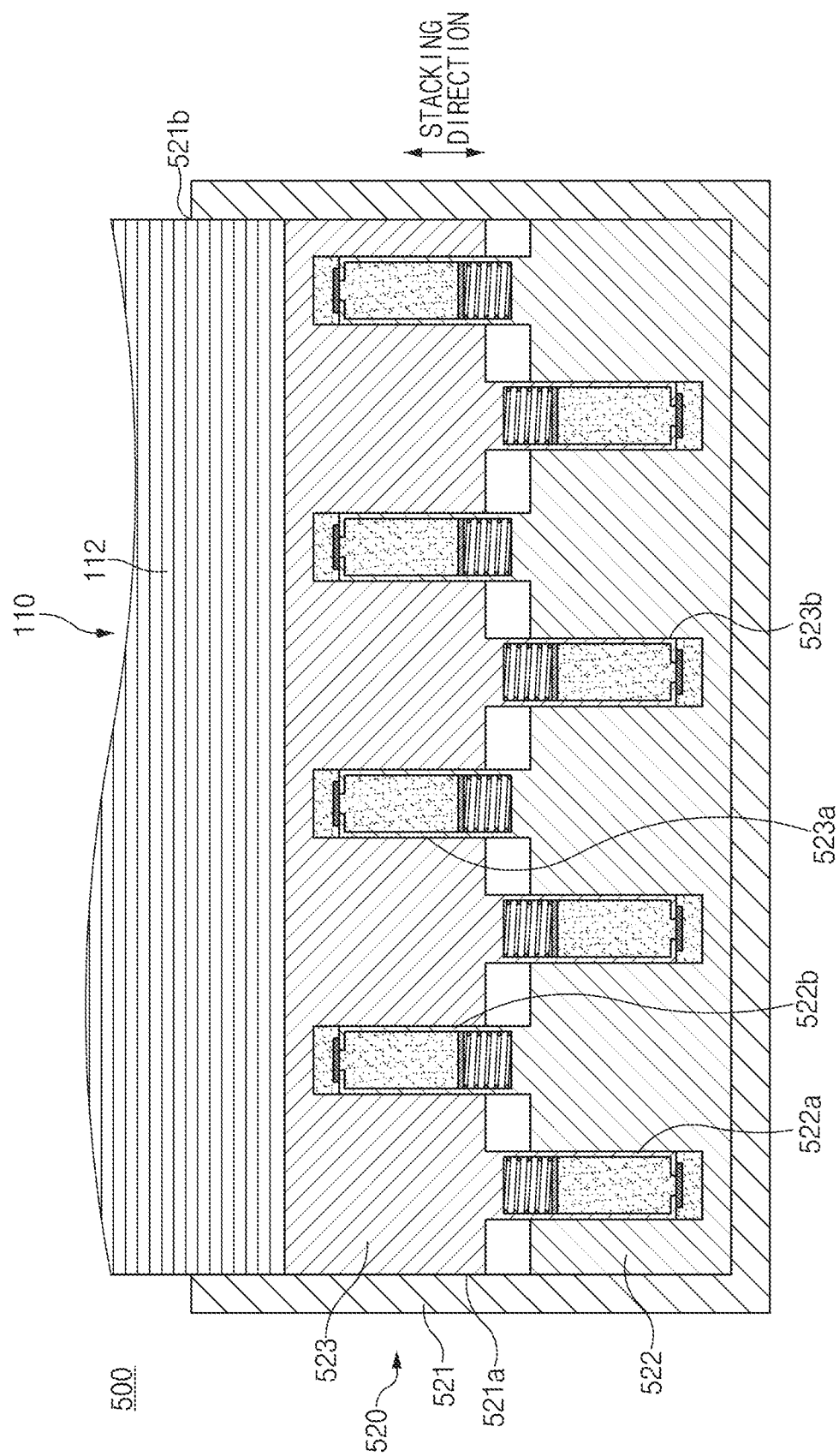

Hereinafter, the method of increasing the surface pressure of the unit cells 112 using the surface pressure adjustment unit 520 will be described with reference to FIGS. 20 to 22. A controller 150 may be configured to operate the surface pressure adjusting unit 520 as described above to adjust the surface pressure of the unit cells 112 to become a predetermined reference surface pressure. For example, as illustrated in FIGS. 20 to 22, the controller 150 may be configured to adjust the surface pressure of the unit cells 112 to the reference surface pressure by applying a current to the electromagnets 522 and 523 to slide and move the second electromagnet 523 toward the cell laminate 110 and apply pressurizing force to the cell laminate 110 when a surface pressure of the unit cells 112 measured by a surface pressure measuring sensor 160 is decreased to be less than the predetermined reference surface pressure.

In particular, the fluid F filled in the first internal space 522f may be partially introduced into the intermediate space 525 between the guide protrusion 522b and the guide groove 523a while elastically deforming the opening/closing valve 526 to open the connection aperture 522d, and when introduction of the fluid F into the intermediate space 525 between the guide protrusion 522b and the guide groove 523a is completed, the opening/closing valve 526 may be elastically recovered to an original state, to close the connection aperture 522d. Therefore, even though the current applied to the electromagnets 522 and 523 is blocked and thus the electromagnets 522 and 523 are stopped, the fluid F introduced into the intermediate space 525 between the guide protrusion 522b and the guide groove 523a may remain in the intermediate space 525 between the guide protrusion 522b and the guide groove 523a to thus maintain the surface pressure of the unit cells 112 to the reference surface pressure.

Figure 23:
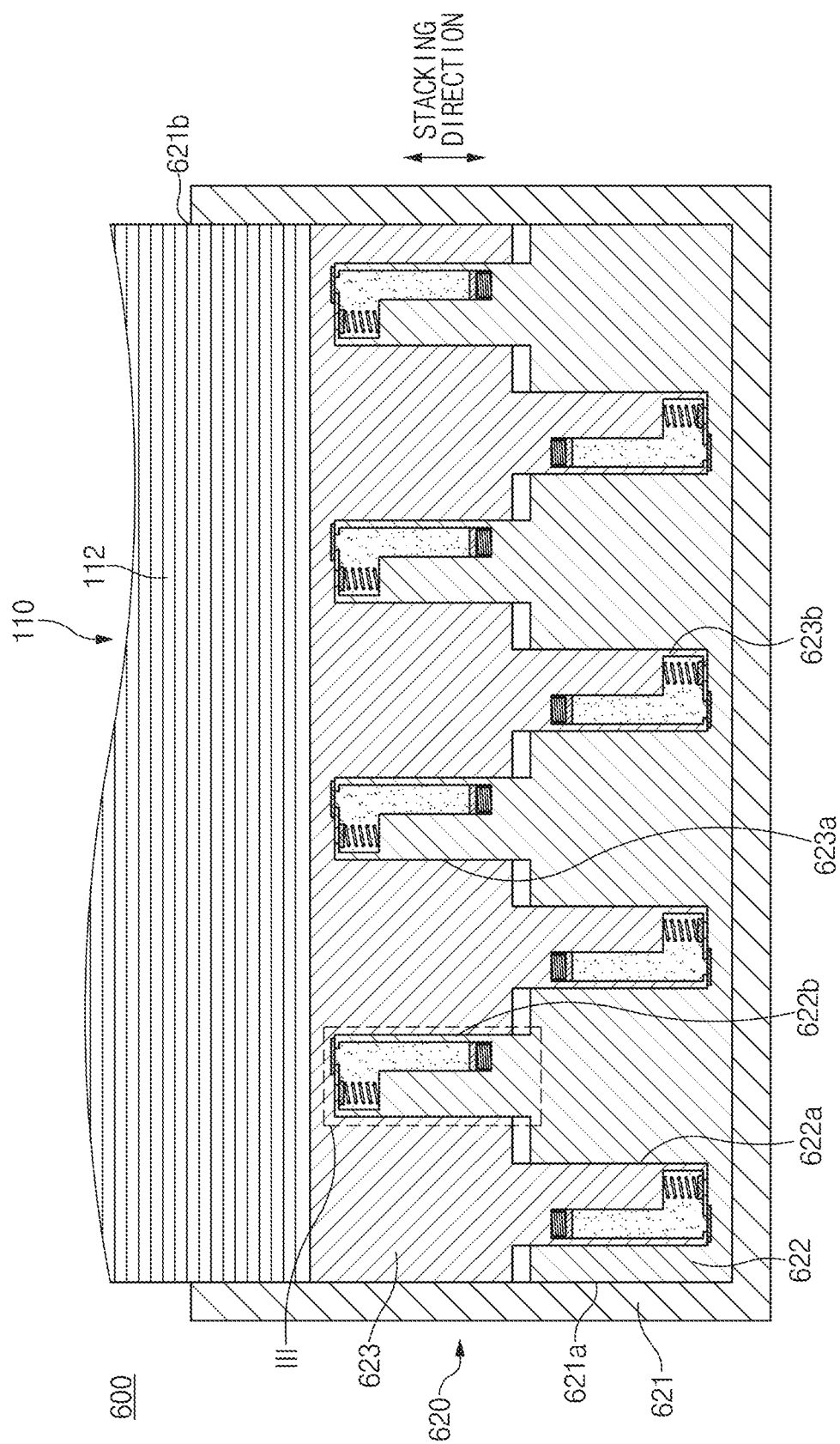
FIG. 23 is a partial cross-sectional view of a fuel cell stack according to a sixth exemplary embodiment of the present disclosure.
Figure 24:
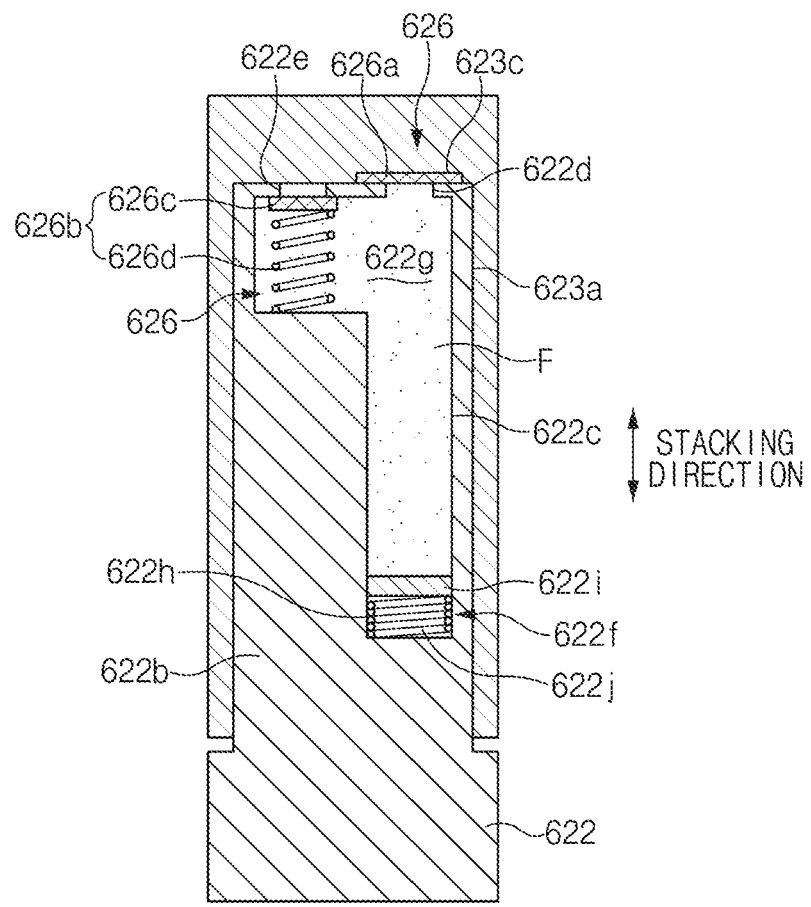
FIG. 24 is a partially enlarged view of part III of FIG. 23 according to a sixth exemplary embodiment of the present disclosure.
Figure 25:
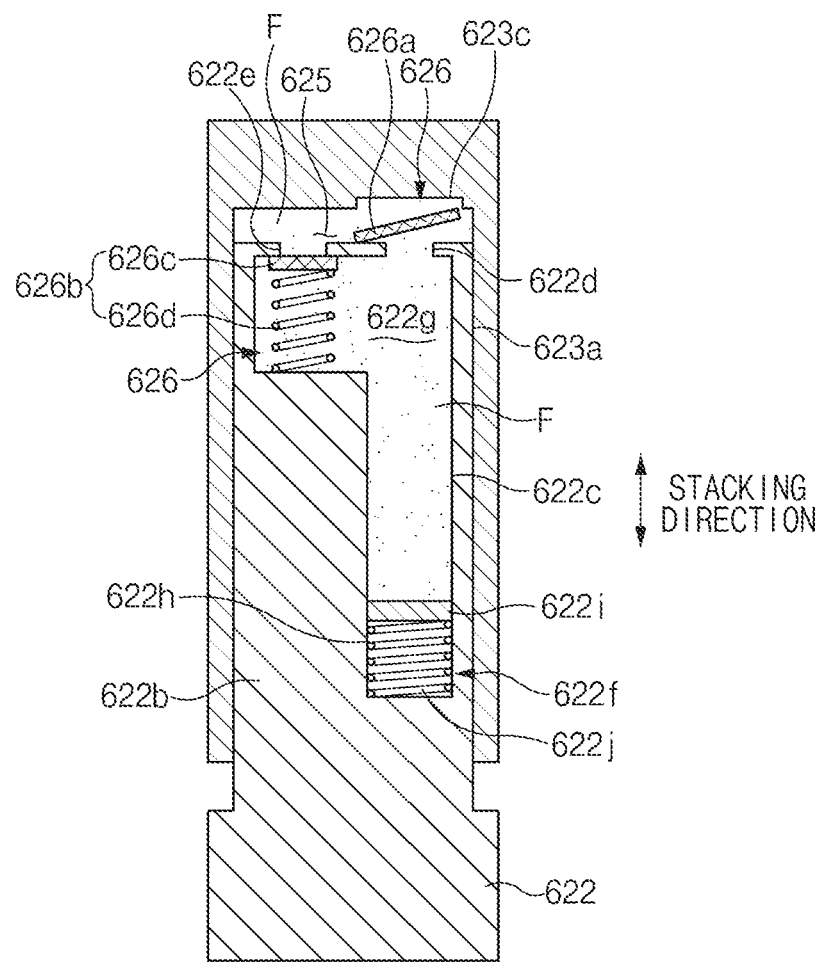
FIGS. 25 to 27 are views illustrating a method of increasing a surface pressure of unit cells using a surface pressure adjustment unit illustrated in FIG. 24 according to a sixth exemplary embodiment of the present disclosure.
Figure 26:
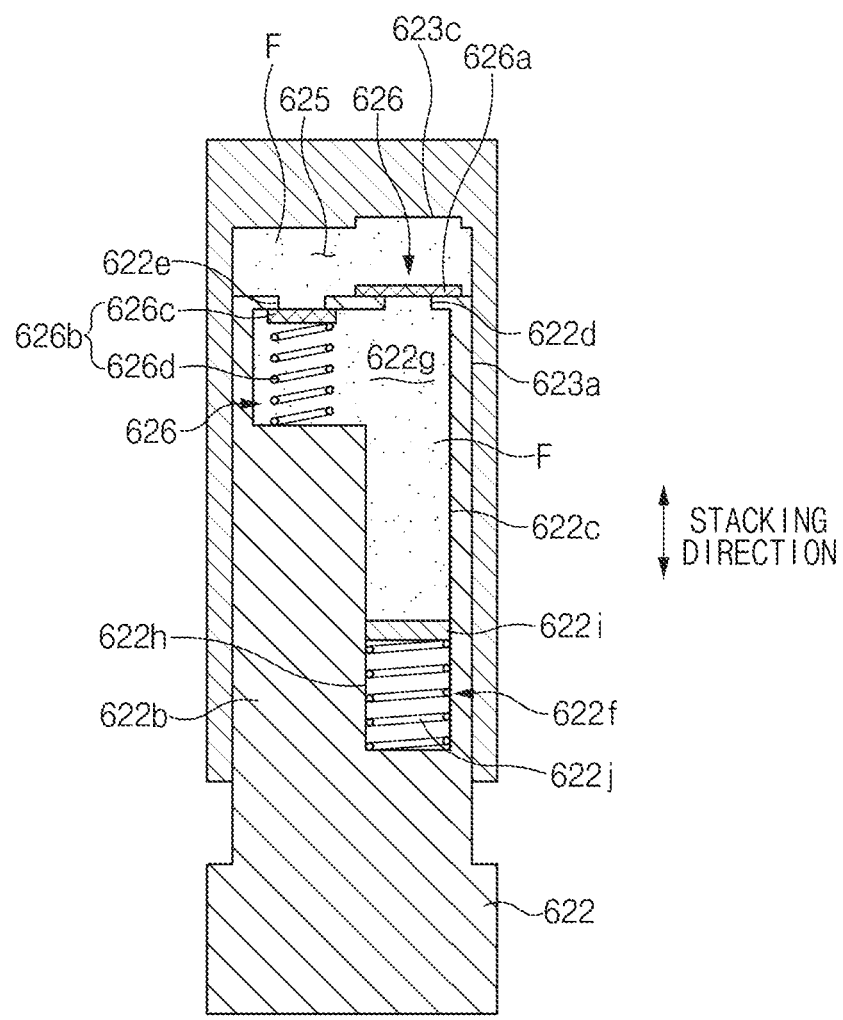
Figure 27:
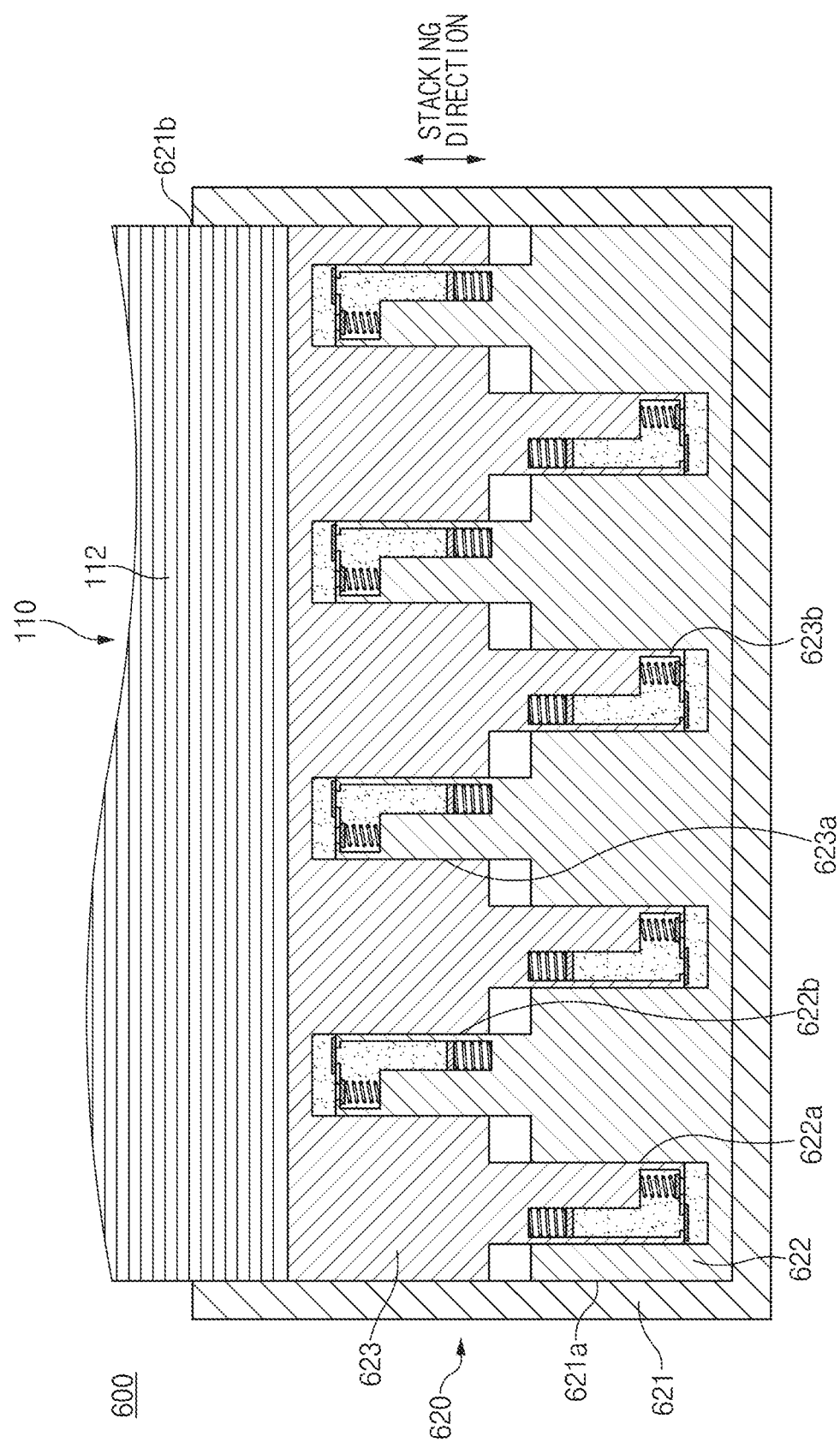
Figure 28:
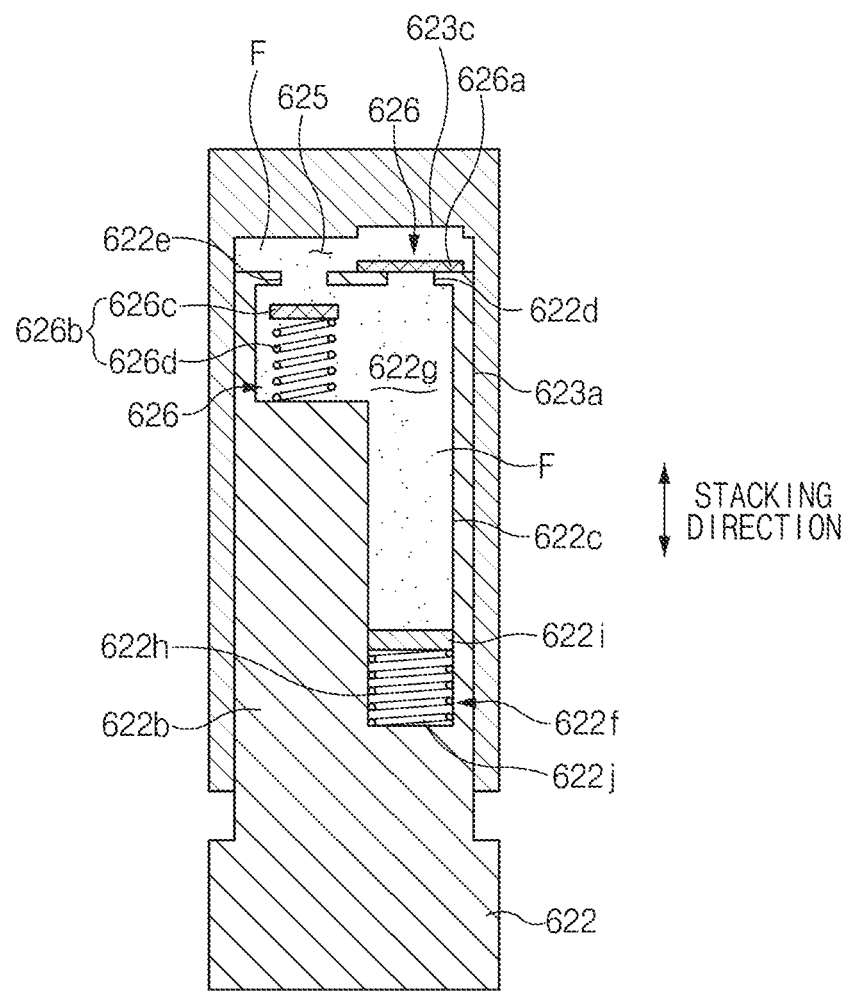
FIGS. 28 and 29 are views illustrating a method of decreasing the surface pressure of the unit cells using the surface pressure adjustment unit illustrated in FIG. 24 according to a sixth exemplary embodiment of the present disclosure.
Figure 29:
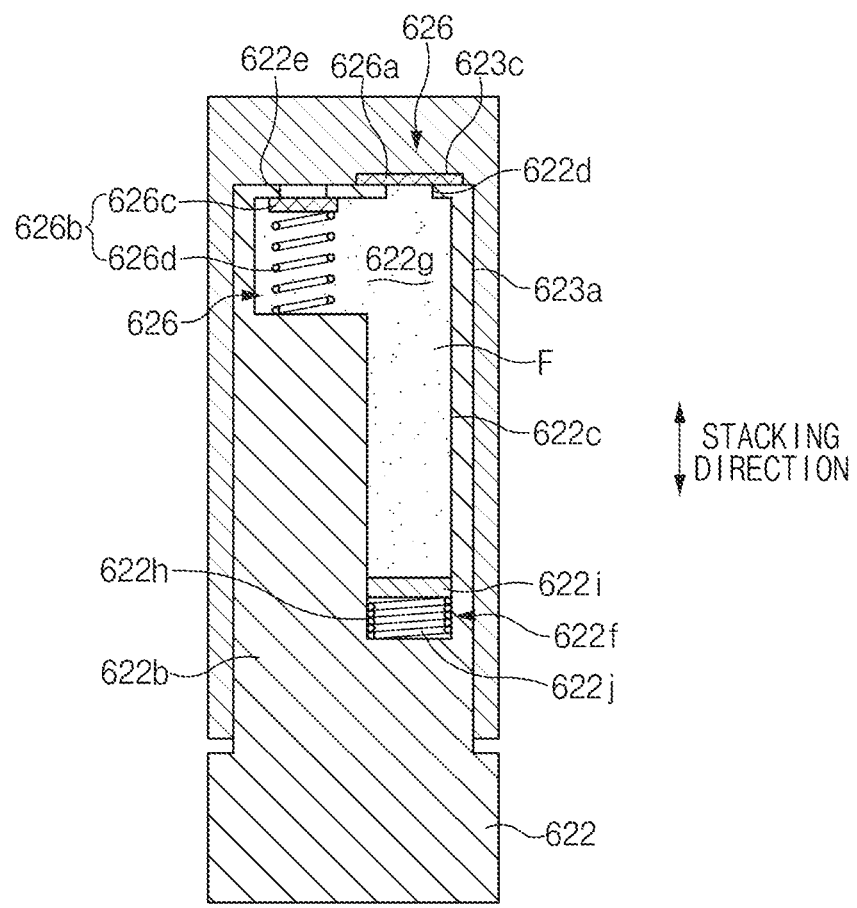

FIG. 23 is a partial L s-sectional view of a fuel cell stack according to a sixth exemplary embodiment of the present disclosure, and FIG. 24 is a partially enlarged view of part III of FIG. 23. Further, FIGS. 25 to 27 are views illustrating a method of increasing a surface pressure of unit cells using a surface pressure adjustment unit illustrated in FIG. 24, and FIGS. 28 and 29 are views illustrating a method of decreasing the surface pressure of the unit cells using the surface pressure adjustment unit illustrated in FIG. 24.

Referring to FIG. 23, a fuel cell stack 600 according to the sixth exemplary embodiment of the present disclosure is different from the above-mentioned fuel cell stack 500 in that a structure of a surface pressure adjustment unit 620 is changed to decrease a surface pressure of unit cells 112. Hereinafter, the fuel cell stack 600 will be described based on the surface pressure adjustment unit 620. In addition, for convenience of explanation, hereinafter, a guide protrusion 622b of a first electromagnet 622 and a guide groove 623a of a second electromagnet 623 into which the guide protrusion 622b of the first electromagnet 622 as described above may be inserted will be described A description of the guide protrusion 622b of the first electromagnet 622 and the guide groove 623a of the second electromagnet 623 may be applied to a guide groove 622a of the first electromagnet 623 and a guide protrusion 623b of the second electromagnet 623 as it is.

As illustrated in FIG. 24, the guide protrusion 622b may have an internal space 622c filled with a fluid F, first and second connection holes 622d and 622e allowing the internal space 622c to be opened toward a cell laminate 110, respectively, and a pressurizing member 622f may be configured elastically pressurize the fluid F filled in the internal space 622c. The internal space 622c may be partitioned into a first internal space 622g that communicates with the connection apertures 622d and 622e and a second internal space 622h blocked from being connected to the connection holes 622d and 622e by a partition plate 622i to be described below. The fluid F may be filled in the first internal space 622g.

Each of the first and second connection apertures 622d and 622e may be formed to open the first internal space 622g toward the cell laminate 110. The pressurizing member 622f may have the partition plate 622i installed to be slidably moved in the stacking direction in the internal space 622c to partition the internal space 622c into the first and second internal spaces 622g and 622h, an elastic member 622j allowing the partition plate 622i to be elastically biased, and the like.

However, an intermediate space 625 between the guide protrusion 622b and the guide groove 623a may be connected to the first internal space 622g through the connection apertures 622d and 622e. Therefore, while the second electromagnet 623 may be slid and moved in the stacking direction to be directed toward the cell laminate 110 or toward an opposite side of the cell laminate 110, the fluid F may flow from the first internal space 622g to the intermediate space 625 between guide protrusion 622b and the guide groove 623a or flows from the intermediate space 625 between guide protrusion 622b and the guide groove 623a to the first internal space 622g through the connection apertures 622d and 622e. Therefore, the surface pressure adjustment unit 620 may further include an opening/closing valve 626 configured to selectively open or close each of the connection apertures 622d and 622e to adjust a flow of the fluid F through the connection apertures 622d and 622e.

The opening/closing valve 626 may have a first opening/closing valve 626a configured to open or close the first connection aperture 622d to allow the fluid F to flow from the first internal space 622g to the intermediate space 625 between the guide protrusion 622b and the guide groove 623a through the first connection aperture 622d, and a second opening/closing valve 626b to configured to open or close the second connection aperture 622e to allow the fluid F to flow from the intermediate space 625 between the guide protrusion 622b and the guide groove 623a to the first internal space 622g through the second connection aperture 622e.

The first opening/closing valve 626a may be elastically deformed by a pressure of the fluid F and may have an area greater than that of the first connection aperture 622d to cover the first connection aperture 622d. The opening/closing valve 626 as described above may be fixed to an outer side of the guide protrusion 622b facing an inner side surface of the guide groove 623a to cause the opening/closing valve 626 to close the first connection aperture 622d. In response, the guide groove 623a may have a support groove 623c having a shape that corresponds to the first opening/closing valve 626a to accommodate the first opening/closing valve 626a therein, and pressurizing an upper surface of the first opening/closing valve 626a to support the first opening/closing valve 626a when the electromagnets 622 and 623 are disposed to cause an outer side surface of the guide protrusion 622b and the inner side surface of the guide groove 623a to abut each other.

The second opening/closing valve 626b may include a cover plate 626c having an area greater than that of the second connection aperture 622e to cover the second connection aperture 622e and installed in the first internal space 622g, and an elastic member 626d elastically pressurizing the cover plate 626c toward an inner side surface of the first internal space 622g to cause the cover plate 626c to abut the inner surface of the first internal space 622g when the cover plate 626c covers the second connection aperture 622e. The elastic member 626d may be formed to push the cover plate 626c toward the opposite side of the cell laminate 110 by a pressure of the fluid F introduced into the intermediate space 625 between the guide protrusion 622b and the guide groove 623a when the pressure of the fluid F introduced into the intermediate space 625 between the guide protrusion 622b and the guide groove 623a is greater than a pressure of the fluid F filled in the first internal space 622g by a predetermined pressure. The elastic member 626d as described above may be a compression coil spring, but the elastic member 626d is not limited thereto.

Hereinafter, the method of increasing the surface pressure of the unit cells 112 using the surface pressure adjustment unit 620 will be described with reference to FIGS. 25 to 27. As illustrated in FIGS. 25 to 27, the controller 150 may be configured to adjust the surface pressure of the unit cells 112 to the reference surface pressure by applying a current to the electromagnets 622 and 623 to slide and move the second electromagnet 623 toward the cell laminate 110 and apply pressurizing force to the cell laminate 110 when a surface pressure of the unit cells 112 measured by a surface pressure measuring sensor 160 is decreased to be less than the predetermined reference surface pressure. In particular, the fluid F filled in the first internal space 622g is partially introduced into the intermediate space 625 between the guide protrusion 622b and the guide groove 623a while elastically deforming the first opening/closing valve 626a to open the first connection aperture 622d.

Further, when introduction of the fluid F into the intermediate space 625 between the guide protrusion 622b and the guide groove 623a is completed and the pressure of the fluid F introduced into the intermediate space 625 between the guide protrusion 622b and the guide groove 623a and the pressure of the fluid F filled in the first internal space 622g are balanced with each other, the first opening/closing valve 626a may be elastically recovered to an original state, to close the first connection aperture 622d. In addition, since the cover pate 626c of the second opening/closing valve 626b is in a state in which the cover plate 626c is elastically pressurized by the elastic member 626d to be supported by the inner side surface of the first internal space 622g, the state in which the second connection aperture 622e is closed may be maintained. Therefore, even though the current applied to the electromagnets 622 and 623 is blocked and thus the electromagnets 622 and 623 are stopped, the fluid F introduced into the intermediate space 625 between the guide protrusion 622b and the guide groove 623a may remain in the intermediate space 625 between the guide protrusion 622b and the guide groove 623a as it is, thereby making it possible to maintain the surface pressure of the unit cells 112 to the reference surface pressure.

Hereinafter, the method of decreasing the surface pressure of the unit cells 112 using the surface pressure adjustment unit 620 will be described with reference to FIGS. 28 and 29. As described above, after the surface pressure of the unit cells 112 is increased up to a reference pressure by sliding and moving the second electromagnet 623 toward the cell laminate 110, the surface pressure of the unit cells 112 may be additionally increased by other causes of heat expansion of the fuel cell stack 600, such that the surface pressure of the unit cells 112 may be increased to exceed the reference pressure.

Accordingly, the controller 150 may be configured to decrease the surface pressure of the unit cells 112 up to the reference surface pressure by applying the current to the electromagnets 622 and 623 to slide and move the second electromagnet 623 toward the opposite side of the cell laminate 110 when the surface pressure of the unit cells 112 measured by the surface pressure measuring sensor 160 exceeds the reference surface pressure. As illustrated in FIG. 28, when the second electromagnet 623 is slid and moved toward the opposite side of the cell laminate 110 to abut the first electromagnet 622, the fluid F introduced into the intermediate space 625 between the guide protrusion 622b and the guide groove 623a may be pressurized by the second electromagnet 623.

Therefore, the fluid F introduced into the intermediate space 625 between the guide protrusion 622b and the guide groove 623a may pressurize the cover plate 626c toward the opposite side of the cell laminate 110 to compress the elastic member 626d of the second opening/closing valve 626b, to cause the cover plate 626c to be spaced apart from the inner side surface of the first internal space 622g. Then, the second connection aperture 622e may be opened, to cause the fluid F to flow from the intermediate space 625 between the guide protrusion 622b and the guide groove 623a to the first internal space 622g through the second connection aperture 622e. As illustrated in FIG. 29, when sliding movement of the second electromagnet 623 may be stopped, the pressure of the fluid F introduced into the intermediate space 625 between the guide protrusion 622b and the guide groove 623a and the pressure of the fluid F filled in the first internal space 622g may be balanced with each other, and the cover plate 626c may abut the inner side surface of the first internal space 622g by the elastic member 626d elastically recovered to an original state, thereby closing the second connection aperture 622e again.

As described above, when the second electromagnet 623 is slid and moved toward the opposite side of the cell laminate 110 and the fluid F introduced into the intermediate space 625 between the guide protrusion 622b and the guide groove 623a may flow to the first internal space 622g, pressurizing force applied to the cell laminate 110 by the second electromagnet 623 or the fluid F may be decreased, to adjust the surface pressure of the unit cells 112 to the reference surface pressure.

Figure 30:
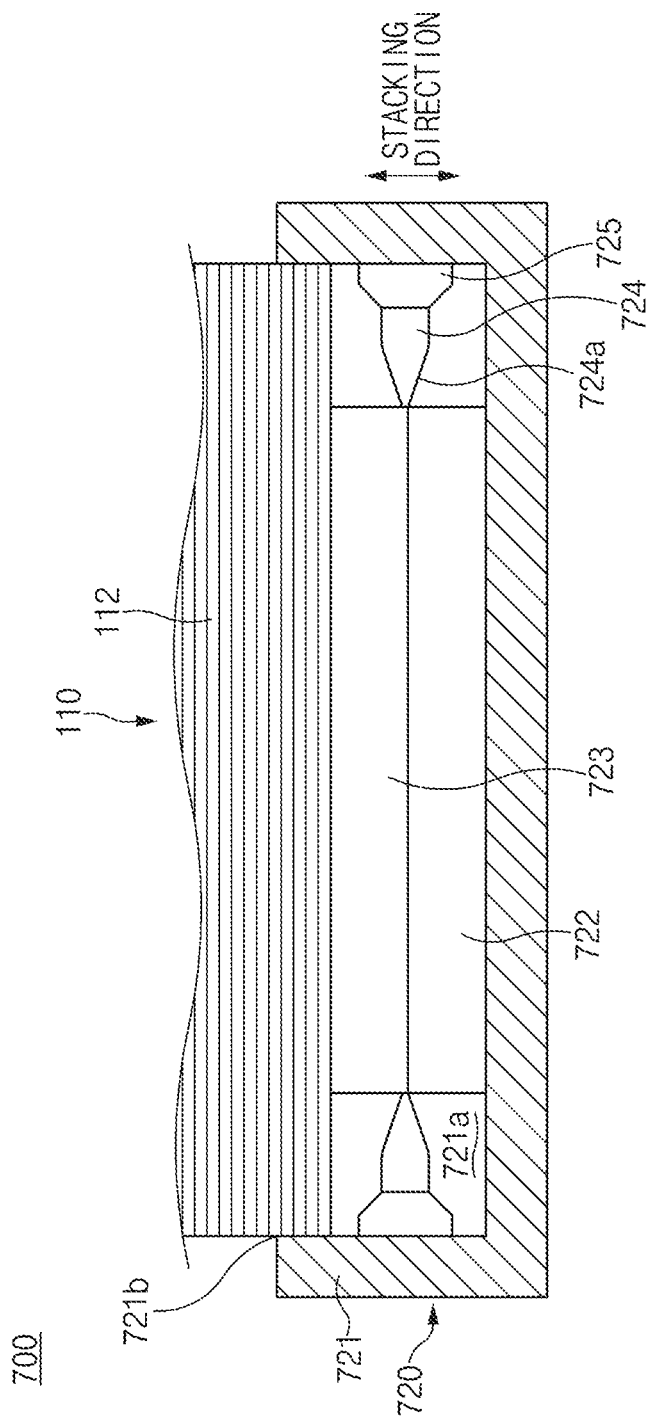
FIG. 30 is a partial cross-sectional view of a fuel cell stack according to a seventh exemplary embodiment of the present disclosure.
Figure 31:
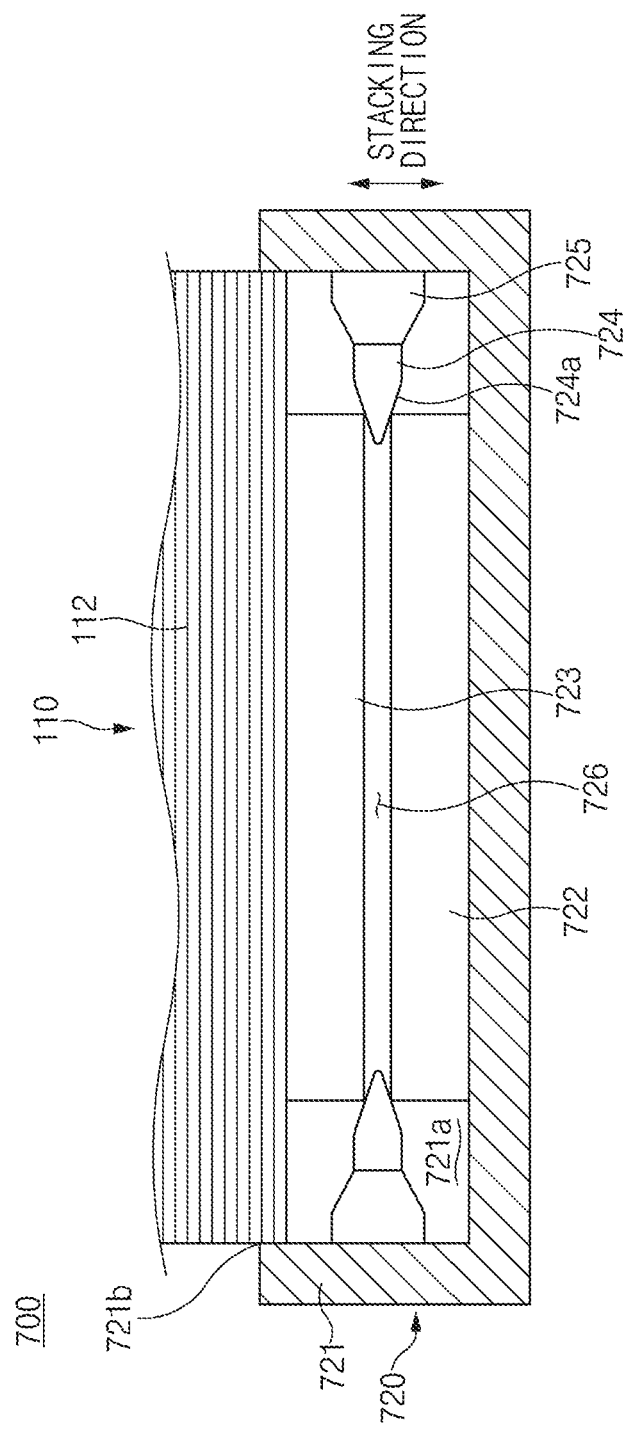
FIG. 31 is a conceptual view illustrating a method of increasing a surface pressure of unit cells using a surface pressure adjustment unit illustrated in FIG. 30 according to a seventh exemplary embodiment of the present disclosure.

FIG. 30 is a partial cross-sectional view of a fuel cell stack according to a seventh exemplary embodiment of the present disclosure, and FIG. 31 is a conceptual view illustrating a method of increasing a surface pressure of unit cells using a surface pressure adjusting unit illustrated in FIG. 30. Referring to FIG. 30, a fuel cell stack 700 according to the seventh exemplary embodiment of the present disclosure is different from the above-mentioned fuel cell stack 200 in that a structure of a surface pressure adjustment unit 720 is changed. Hereinafter, the fuel cell stack 700 will be described based on the surface pressure adjustment unit 720.

The surface pressure adjustment unit 720 may include a housing 721 having an accommodation space 721a formed therein and fixedly installed to a first surface of a cell laminate 110, a first electromagnet 722 fixedly installed in the accommodation space 721a of the housing 721, a second electromagnet 723 installed to be slidably moved in a stacking direction in the accommodation space 721a of the housing 721 to be positioned between the first electromagnet 722 and the first surface of the cell laminate 110, a wedge 724 formed to be inserted into an intermediate space 726 between the electromagnets 722 and 723, and an elastic member 725 configured to elastically pressurize the wedge 724 to cause the wedge 724 to enter into the intermediate space between the electromagnets 722 and 723 when the second electromagnet 723 is spaced apart from the first electromagnet 722.

The accommodation space 721a may formed to have a predetermined volume to accommodate components of the surface pressure adjustment unit 720 therein. An opening 721b may have a predetermined cross-sectional area to insert the first end portion of the cell laminate 110 including the first surface of the cell laminate 110 into the accommodation space 721a through the opening 721b to be slidably moved in the stacking direction. The first electromagnet 722 may be fixedly installed at a predetermined position of the accommodation space 721a, and the second electromagnet 723 may be installed to be slidably moved in the stacking direction in the accommodation space 721a to be positioned between the first electromagnet 722 and the first surface of the cell laminate 110.

As illustrated in FIG. 30, the wedge 724 may be installed with a first end portion thereof is elastically supported by the elastic member 725 and a second end portion thereof supported by a side surface of the second electromagnet 723. The wedge 724 may be installed in a horizontal direction of the second electromagnet 723, but the wedge 724 is not limited thereto. The wedge 724 may have an inclined structure in which a thickness thereof in the stacking direction is gradually decreased from the elastic member 725 toward the second electromagnet 723. The number of installed wedge 724 is not particularly limited, but at least one wedge 724 may be installed. The elastic member 725 may be configured to elastically pressurize the wedge 724 toward the side surface of the second electromagnet 723. The type of elastic member 725 is not particularly limited. For example, the elastic member 725 may be a disk spring.

Hereinafter, the method of increasing a surface pressure of unit cells 112 using the surface pressure adjustment unit 720 will be described with reference to FIG. 31. A controller 150 may be configured to operate the surface pressure adjusting unit 720 as described above to adjust the surface pressure of the unit cells 112 to be a predetermined reference surface pressure. For example, as illustrated in FIG. 31, the controller 150 may be configured to adjust the surface pressure of the unit cells 112 to the reference surface pressure by applying a current to the electromagnets 722 and 723 to slide and move the second electromagnet 723 toward the cell laminate 110 and apply pressurizing force to the cell laminate 110 when a surface pressure of the unit cells 112 measured by a surface pressure measuring sensor 160 is decreased to be less than the predetermined reference surface pressure.

In particular as the second electromagnet 723 may be slid and moved, a state in which the wedge 724 is supported by the second electromagnet 723 is released. Therefore, the elastic member 725 may be expanded and the wedge 724 may be entered into the intermediate space 726 between the electromagnets 722 and 723 by the elastic member 725 as described above to thereby be interposed between the electromagnets 722 and 723. The wedge 724 interposed between the electromagnets 722 and 723 as described above supports the first electromagnet 722 to prevent the second electromagnet 723 from sliding and moving toward the first electromagnet 722 when the current applied to the electromagnets 722 and 723 is blocked and the electromagnets 722 and 723 are stopped. Therefore, the fuel cell stack 700 may maintain the surface pressure of the unit cells 112 to the reference surface pressure using the wedge 724 even when operating the electromagnets 722 and 723 for a predetermined period of time and stopping the operation of the electromagnets 722 and 723 instead of continuously operating the electromagnets 722 and 723 when there is a need to adjust the surface pressure of the unit cells 112.

Hereinafter, the method of decreasing the surface pressure of the unit cells 112 using the surface pressure adjustment unit 720 will be described with reference to FIG. 30. As described above, after the surface pressure of the unit cells 112 is increased up to a reference pressure by sliding and moving the second electromagnet 723 toward the cell laminate 110, the surface pressure of the unit cell 112 may be additionally increased by other causes of heat expansion of the fuel cell stack 700, to increase the surface pressure of the unit cells 112 to exceed the reference pressure.

Accordingly, the controller 150 may be configured to decrease the surface pressure of the unit cells 112 up to the reference surface pressure by applying the current to the electromagnets 723 and 722 to slide and move the second electromagnet 723 toward the opposite side of the cell laminate 110 when the surface pressure of the unit cells 112 measured by the surface pressure measuring sensor 160 exceeds the reference surface pressure. As described above, the wedge 724 may have an inclined structure in which the thickness thereof is gradually decreased from the elastic member 725 toward the side surface of the second electromagnet 723. Therefore, as illustrated in FIG. 30, when an inclined surface 724a of the wedge 724 is pressurized to a predetermined pressure by the second electromagnet 723 slid and moved toward the opposite side of the cell laminate 110, the wedge 724 may be moved to be led from the intermediate space 726 between the electromagnets 722 and 723 to be supported by the side surface of the second electromagnet 723, and the elastic member 725 may be compressed again.

As described above, according to the exemplary embodiment of the present disclosure, since the fuel cell stack may adjust the surface pressure of the unit cells by applying pressurizing force to the unit cells using magnetic force acting between the electromagnets, it may be possible to prevent performance of the fuel cell stack from being deteriorated due to a decrease or increase in surface pressure of the unit cells.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A fuel cell stack, comprising:
 a cell laminate formed by stacking a plurality of unit cells in a predetermined stacking direction; and
 a surface pressure adjustment unit stacked on one surface of the cell laminate and configured to adjust a surface pressure applied to the unit cells in the stacking direction,
 wherein the surface pressure adjustment unit includes:
 a first electromagnet;
 a second electromagnet installed between a first surface of the cell laminate and the first electromagnet to pressurize the unit cells; and
 a controller configured to adjust pressurizing force applied to the unit cells by the second electromagnet by selectively applying a current to the first and second electromagnets so that attractive force or repulsive force acts between the first and second electromagnets.

2. The fuel cell stack according to claim 1, wherein the surface pressure adjustment unit further includes a housing having an accommodation space in which the first and second electromagnets are accommodated.

3. The fuel cell stack according to claim 2, wherein the second electromagnet is installed to be slidably moved in the stacking direction to be spaced apart from the first electromagnet or to abut the first electromagnet.

4. The fuel cell stack according to claim 3, wherein the housing further has an opening allowing the accommodation space to be opened toward one surface of the cell laminate.

5. The fuel cell stack according to claim 4, wherein a first end portion of the cell laminate is inserted into the accommodation space through the opening.

6. The fuel cell stack according to claim 4, wherein the second electromagnet has a predetermined cross-sectional area to guide a first end portion thereof to the outside of the accommodation space through the opening.

7. The fuel cell stack according to claim 3, wherein the housing further includes:
 a fluid chamber disposed between the first electromagnet and an inner side surface of the housing and having an internal space filled with a fluid, and the first electromagnet includes a connection aperture punctured to connect an intermediate space between the first and second electromagnets to the internal space of the fluid chamber, and an opening/closing valve configured to open or close the connection aperture to adjust a flow of the fluid through the connection aperture.

8. The fuel cell stack according to claim 7, wherein the opening/closing valve has an area greater than that of the connection aperture to cover the connection aperture, and is formed to be elastically deformed by a pressure of the fluid.

9. The fuel cell stack according to claim 8, wherein the opening/closing valve is mounted to cover the connection aperture on a first surface of the first electromagnet facing a first surface of the second electromagnet to be selectively supported by the first surface of the second electromagnet when a spaced distance between the first and second electromagnets is less than a predetermined reference distance.

10. The fuel cell stack according to claim 3, wherein one of the first and second electromagnets includes a guide groove formed to be depressed in the stacking direction, and one of the first and second electromagnets includes a guide protrusion formed to protrude to insert the guide protrusion into the guide groove to be slidably moved in the stacking direction.

11. The fuel cell stack according to claim 10, wherein the guide protrusion has an internal space filled with a fluid, a connection aperture that connects an intermediate space between the guide protrusion and the guide groove to the internal space, and an opening/closing valve configured to open or close the connection aperture to adjust a flow of the fluid through the connection aperture.

12. The fuel cell stack according to claim 11, wherein the connection aperture has first and second connection apertures formed, respectively, to connect the intermediate space to the internal space, and the opening/closing valve has a first opening/closing valve configured to open or close the first connection aperture to allow the fluid to flow from the internal space to the intermediate space through the first connection aperture, and a second opening/closing valve configured to open or close the second connection aperture to allow the fluid to flow from the intermediate space to the internal space through the second connection aperture.

13. The fuel cell stack according to claim 12, wherein the first opening/closing valve has an area greater than that of the first connection aperture to cover the first connection aperture, and is formed to be elastically deformed by a pressure of the fluid.

14. The fuel cell stack according to claim 13, wherein the first opening/closing valve is mounted to cover the first connection aperture on an outer side surface of the guide protrusion facing an inner side surface of the guide groove to be supported by the inner side surface of the guide groove when an interval between the first and second electromagnets is less than a predetermined reference interval.

15. The fuel cell stack according to claim 13, wherein one of the first and second electromagnets further includes a pressurizing member configured to elastically pressurize the fluid filled in the internal space.

16. The fuel cell stack according to claim 12, wherein the second opening/closing valve includes:
a cover plate having an area greater than that of the second connection aperture to cover the second connection aperture, and installed in the internal space; and
an elastic member configured to elastically pressurize the cover plate toward an inner side surface of the internal space to cause the cover plate to abut the inner side surface of the internal space when the cover plate covers the second connection aperture.

17. The fuel cell stack according to claim 3, wherein the surface pressure adjustment unit includes:
a wedge; and
an elastic member configured to elastically pressurize the wedge to be entered into an intermediate space between the first and second electromagnets when the second electromagnet is spaced apart from the first electromagnet.

18. The fuel cell stack according to claim 17, wherein the wedge has an inclined structure in which a thickness thereof in the stacking direction is gradually decreased from the elastic member to the intermediate space.

19. The fuel cell stack according to claim 1, further comprising:
an end plate stacked on a second surface of the cell laminate; and
a fastening member configured to fasten the end plate and the surface pressure adjustment unit to each other.

20. The fuel cell stack according to claim 19, wherein the fastening member is a fastening band provided to be elastically deformed in the stacking direction.

* * * * *